United States Patent
Chen et al.

(10) Patent No.: US 10,320,304 B2
(45) Date of Patent: Jun. 11, 2019

(54) POWER CONVERTER AND SECONDARY SIDE CONTROLLER AND SHORT CIRCUIT DETERMINATION METHOD FOR CURRENT SENSING RESISTOR OF THE POWER CONVERTER

(71) Applicant: RICHTEK TECHNOLOGY CORPORATION, Chupei, HsinChu (TW)

(72) Inventors: Yu-Kai Chen, Tainan (TW); Kuang-Fu Chang, Kaohsiung (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 0 days.

(21) Appl. No.: 15/290,771

(22) Filed: Oct. 11, 2016

(65) Prior Publication Data
US 2017/0338746 A1    Nov. 23, 2017

Related U.S. Application Data

(60) Provisional application No. 62/340,404, filed on May 23, 2016.

(51) Int. Cl.
| | |
|---|---|
| *H02M 3/335* | (2006.01) |
| *H02M 1/08* | (2006.01) |
| *H02M 1/32* | (2007.01) |
| *H02M 1/00* | (2006.01) |

(52) U.S. Cl.
CPC ......... *H02M 3/33592* (2013.01); *H02M 1/08* (2013.01); *H02M 1/32* (2013.01); *H02M 3/33507* (2013.01); *H02M 2001/0009* (2013.01)

(58) Field of Classification Search
CPC ......... H02M 3/33507; H02M 3/33515; H02M 3/33576; H02M 3/33592; H02M 3/33523
USPC .......................................... 363/21.12–21.18
See application file for complete search history.

(56) References Cited

U.S. PATENT DOCUMENTS

| | | | |
|---|---|---|---|
| 2004/0125621 A1* | 7/2004 | Yang ................ | H02M 3/33592 363/21.14 |
| 2006/0018135 A1* | 1/2006 | Yang ................ | H02M 3/33592 363/21.14 |
| 2015/0318790 A1* | 11/2015 | Tichy ............... | H02M 3/33592 363/21.14 |

(Continued)

*Primary Examiner* — Nguyen Tran
(74) *Attorney, Agent, or Firm* — Tung & Associates

(57) ABSTRACT

The present invention provides a power converter, a secondary side controller, and a short circuit determination method for a current sensing resistor of the power converter. The power converter is controlled by a power switch to convert an input voltage to an output voltage, and provide an output current to an output terminal. The power converter senses the output current by a current sensing resistor to generate first information which relates to the output current. The power converter generates second information according to an ON time, an OFF time or a switching period of the power switch, or according to an energy-releasing period for transmitting energy to the output terminal, wherein the second information indicates whether there is a substantial amount of energy transmitted to the output terminal. By checking whether the first information and the second information are contradictory to each other, a malfunction can be found.

13 Claims, 19 Drawing Sheets

(56) References Cited

U.S. PATENT DOCUMENTS

2016/0149497 A1* 5/2016 Lin .................. H02M 3/33507
363/21.12

* cited by examiner

POWER CONVERTER AND SECONDARY SIDE CONTROLLER AND SHORT CIRCUIT DETERMINATION METHOD FOR CURRENT SENSING RESISTOR OF THE POWER CONVERTER

CROSS REFERENCE

The present invention claims priority to U.S. 62/340,404, filed on May 23, 2016.

BACKGROUND OF THE INVENTION

Field of Invention

The present invention relates to a power converter, a secondary side controller and a short circuit determination method for a current sensing resistor of the power converter; particularly, it relates to such power converter, such secondary side controller and such short circuit determination method which are capable of checking whether an undesirable short circuit occurs in the current sensing resistor, so that the power converter can be well protected.

Description of Related Art

Typically, in a conventional isolated type AC-DC converter wherein a transformer is employed to isolate an input terminal from an output terminal, a primary side of such isolated type AC-DC converter has already been equipped with an input current monitoring mechanism. Nevertheless, because the requirement for the accuracy of the over current protection (OCP) or constant current (CC) operation for the output current of the power converter has become higher and higher, in certain applications, it is preferred to directly monitor the output current by a current sensing resistor connected to an output terminal of the power converter, for more accurate control of the output current.

However, there is a disadvantage associated with this method which monitors the output current only by a current sensing resistor connected to the output terminal of the power converter, that is: when a short circuit occurs in the current sensing resistor, the power converter cannot detect whether the output current is over-loading. Under such circumstance, the power converter cannot be properly protected due to lack of accurate information.

In view of the above, to overcome the drawback in the prior art, the present invention proposes a power converter, a secondary side controller and a short circuit determination method which are capable of checking whether an undesirable short circuit occurs in the current sensing resistor, so that the power converter can be well protected.

SUMMARY OF THE INVENTION

From one perspective, the present invention provides a power converter, configured to operably convert an input voltage to an output voltage at an output terminal of the power converter, the power converter comprising: a transformer including a primary winding and a secondary winding, wherein a secondary side of the transformer forms a current loop, to supply an output current to the output terminal; a power switch coupled to the primary winding of the transformer, wherein the power switch is configured to be operably turned ON or turned OFF according to an operation signal, to control the primary winding of the transformer, so that the input voltage coupled to the primary winding of the transformer is converted to the output voltage coupled to the secondary winding of the transformer; a primary side controller, which is coupled to the power switch and which is configured to operably generate the operation signal according to a primary side feedback signal which is related to the output voltage; a feedback circuit, which is configured to operably generate the primary side feedback signal; a current sensing resistor, which is connected in the current loop formed at the secondary side of the transformer and which is configured to operably detect the output current, so as to generate first information which relates to the output current; a rectifier device, which is coupled to the secondary winding of the transformer and which is configured to operably control a current flow direction of the current loop formed at the secondary side of the transformer; and a secondary side controller, which is coupled to the output terminal and the feedback circuit and which is configured to operably control the generation of the primary side feedback signal by the feedback circuit according to the output voltage, the secondary side controller being coupled to the current sensing resistor to retrieve the first information, and being coupled to at least one end of the rectifier device to retrieve second information, wherein the second information indicates whether there is a substantial amount of energy transmitted to the output terminal; wherein, by checking whether the first information and the second information are contradictory to each other, the secondary side controller determines whether there is a malfunction.

In one embodiment, when the first information indicates that there is no current or there is only few current but the second information indicates that there is a substantial amount of energy transmitted to the output terminal, it is determined that the current sensing resistor is short-circuited.

In one embodiment, the second information is obtained according to an ON time, an OFF time, a switching period, or a switching frequency of the power switch, or an energy-releasing period of the secondary winding of the transformer.

In one embodiment, the rectifier device includes a diode having an anode coupled to the current sensing resistor and a cathode coupled to the secondary winding of the transformer; or the rectifier device includes a synchronous rectifying switch, the synchronous rectifying switch including a switch connected with a diode in parallel, wherein the diode has an anode coupled to the current sensing resistor and a cathode coupled to the secondary winding of the transformer.

In one embodiment, the second information is retrieved from an end of the rectifier device, the end being coupled to the secondary winding of the transformer.

In one embodiment, the rectifier device includes a synchronous rectifying switch and the second information is retrieved from a gate signal of the synchronous rectifying switch.

In one embodiment, the secondary side controller includes: a current sensing circuit, which is configured to operably generate a current sensing signal indicating the first information according to the output current; a current sensing resistor short circuit determination circuit, which is configured to operably generate a determination signal indicating the second information according to a signal waveform at the at least one end of the rectifier device; and a logic determination circuit, which is configured to operably check whether the first information and the second information are contradictory to each other according to the current sensing signal and the determination signal.

In one embodiment, the current sensing resistor short circuit determination circuit includes: a time determination circuit, which is configured to operably obtain the ON time, the OFF time or the switching period of the power switch or the energy-releasing period of the secondary winding of the transformer according to the signal waveform at the at least one end of the rectifier device, to generate time information; a time to voltage conversion circuit, which is configured to operably generate voltage information corresponding to the time information according to the time information generated by the time determination circuit; and a comparison circuit, which is configured to operably compare the voltage information with a voltage threshold, so as to generate the determination signal.

From another perspective, the present invention provides secondary side controller for use in a power converter, the power converter being configured to operably convert an input voltage to an output voltage at an output terminal of the power converter, the power converter comprising: a transformer including a primary winding and a secondary winding, wherein a secondary side of the transformer forms a current loop, to supply an output current to the output terminal; a power switch, which is coupled to the primary winding of the transformer and which is configured to control the primary winding of the transformer, so that the input voltage coupled to the primary winding of the transformer is converted to the output voltage coupled to the secondary winding of the transformer; a primary side controller, which is coupled to the power switch and which is configured to operably control the power switch according to a primary side feedback signal which is related to the output voltage; a feedback circuit, which is configured to operably generate the primary side feedback signal; a current sensing resistor, which is connected in the current loop formed at the secondary side of the transformer and which is configured to operably detect the output current, so as to generate first information which relates to the output current; a rectifier device, which is coupled to the secondary winding of the transformer and which is configured to operably control a current flow direction of the current loop formed at the secondary side of the transformer; and the secondary side controller, which is coupled to the output terminal and the feedback circuit and which is configured to operably control the generation of the primary side feedback signal by the feedback circuit according to the output voltage, the secondary side controller being coupled to the current sensing resistor to retrieve the first information, and the secondary side controller being coupled to at least one end of the rectifier device to retrieve second information, wherein the second information indicates whether there is a substantial amount of energy transmitted to the output terminal; wherein, by checking whether the first information and the second information are contradictory to each other, the secondary side controller determines whether there is a malfunction, the secondary side controller comprising: a current sensing circuit, which is configured to operably generate a current sensing signal indicating the first information according to the output current; a current sensing resistor short circuit determination circuit, which is configured to operably generate a determination signal indicating the second information according to a signal waveform at the at least one end of the rectifier device; and a logic determination circuit, which is configured to operably check whether the first information and the second information are contradictory to each other according to the current sensing signal and the determination signal.

In one embodiment, the current sensing resistor short circuit determination circuit includes: a time determination circuit, which is configured to operably obtain the ON time, the OFF time or the switching period of the power switch or the energy-releasing period of the secondary winding of the transformer according to the signal waveform at the at least one end of the rectifier device, to generate time information; a time to voltage conversion circuit, which is configured to operably generate voltage information corresponding to the time information according to the time information generated by the time determination circuit; and a comparison circuit, which is configured to operably compare the voltage information with a voltage threshold, so as to generate the determination signal.

In one embodiment, the time determination circuit includes: a voltage waveform rising edge detection circuit, which is configured to operably detect a rising edge of the signal waveform at the at least one end of the rectifier device; a voltage waveform falling edge detection circuit, which is configured to operably detect a falling edge of the signal waveform at the at least one end of the rectifier device; and a flip-flop, which is configured to operably generate the time information according to detection results of the voltage waveform rising edge detection circuit and the voltage waveform falling edge detection circuit, indicating the ON time of the power switch.

In one embodiment, the time determination circuit includes: a voltage waveform falling edge detection circuit, which is configured to operably detect a falling edge of the signal waveform at the at least one end of the rectifier device; a voltage waveform ringing comparison circuit, which is configured to operably detect a ringing of the signal waveform at the at least one end of the rectifier device; and a flip-flop, which is configured to operably generate the time information according to detection results of the voltage waveform falling edge detection circuit and the voltage waveform ringing comparison circuit, indicating the OFF time of the power switch or the energy-releasing period of the secondary winding of the transformer.

In one embodiment, the time determination circuit includes: a voltage waveform rising edge detection circuit, which is configured to operably detect a rising edge of the signal waveform at the at least one end of the rectifier device; a delay circuit, which is configured to operably delay a detection result of the voltage waveform rising edge detection circuit, so as to generate a delay output signal; and a flip-flop, which is configured to operably obtain a period between two neighboring rising edges of the signal waveform at the at least one end of the rectifier device according to the detection result of the voltage waveform rising edge detection circuit and the delay output signal, so as to generate the time information indicating the switching period of the power switch.

In one embodiment, the rectifier device includes a synchronous rectifying switch and the time determination circuit generates the time information according to a gate signal of the synchronous rectifying switch.

In one embodiment, the time to voltage conversion circuit includes: a voltage source; a current source coupled to the voltage source; a first switch and a second switch, which are configured to be operably controlled by the time information and a complementary signal of the time information, respectively; a capacitor, which is electrically connected to the current source and a ground via the first switch and the second switch, respectively; wherein the capacitor is configured to operably generate the voltage information corresponding to the time information.

In one embodiment, the time to voltage conversion circuit includes: a sample-and-hold circuit, which is configured to operably sample-and-hold the signal at the at least one end of the rectifier device; a first voltage control current source, which is configured to be operably controlled by a sample-and-hold result of the sample-and-hold circuit; a second voltage control current source, which is configured to be operably controlled by a reference voltage; a switch, which is configured to be operably controlled by the time information; a capacitor, which is electrically connected to the first voltage control current source via the switch and which is electrically connected to the second voltage control current source; wherein the capacitor is configured to operably generate the voltage information corresponding to the time information.

In one embodiment, the logic determination circuit includes a logic gate.

In one embodiment, the logic determination circuit further includes a switch, which is coupled between the determination signal and the logic gate; wherein, after a rising edge or a falling edge of the signal waveform at the at least one end of the rectifier device is detected, the switch is ON, so as to allow the determination signal to be transmitted to the logic gate.

From yet another perspective, the present invention provides a power converter, configured to operably convert an input voltage to an output voltage at an output terminal of the power converter, the power converter comprising: a transformer including a primary winding and a secondary winding, wherein a secondary side of the transformer forms a current loop, to supply an output current to the output terminal; a power switch coupled to the primary winding of the transformer, wherein the power switch is configured to be operably turned ON or turned OFF according to an operation signal, to control the primary winding of the transformer, so that the input voltage coupled to the primary winding of the transformer is converted to the output voltage coupled to the secondary winding of the transformer; a primary side controller, which is coupled to the power switch and which is configured to operably generate the operation signal according to a primary side feedback signal which is related to the output voltage; a feedback circuit, which is configured to operably generate the primary side feedback signal; a current sensing resistor, which is connected in the current loop formed at the secondary side of the transformer and which is configured to operably detect the output current, so as to generate first information which relates to the output current; and a secondary side controller, which is coupled to the current sensing resistor and which is configured to operably retrieve the first information, the secondary side controller being coupled to the output terminal and the feedback circuit and being configured to operably control a current flowing through the feedback circuit according to the output voltage, so as to generate the primary side feedback signal; wherein the secondary side controller retrieves second information which indicates whether there is a substantial amount of energy transmitted to the output terminal according to the current flowing through the feedback circuit; wherein, by checking whether the first information and the second information are contradictory to each other, the secondary side controller determines whether there is a malfunction.

In one embodiment, the secondary side controller includes: a current sensing circuit, which is configured to operably generate a current sensing signal indicating the first information according to the output current; a feedback control current sensing circuit, which is configured to operably sense the current flowing through the feedback circuit; a comparison circuit, which is configured to compare the current flowing through the feedback circuit with a current threshold, to generate a determination signal; and a logic determination circuit, which is configured to operably check whether the first information and the second information are contradictory to each other according to the current sensing signal and the determination signal.

From still another perspective, the present invention provides a secondary side controller for use in a power converter, the power converter being configured to operably convert an input voltage to an output voltage at an output terminal of the power converter, the power converter comprising: a transformer including a primary winding and a secondary winding, wherein a secondary side of the transformer forms a current loop, to supply an output current to the output terminal; a power switch coupled to the primary winding of the transformer, wherein the power switch is configured to be operably turned ON or turned OFF according to an operation signal, to control the primary winding of the transformer, so that the input voltage coupled to the primary winding of the transformer is converted to the output voltage coupled to the secondary winding of the transformer; a primary side controller, which is coupled to the power switch and which is configured to operably control the power switch according to a primary side feedback signal which is related to the output voltage; a feedback circuit, which is configured to operably generate the primary side feedback signal; a current sensing resistor, which is connected in the current loop formed at the secondary side of the transformer and which is configured to operably detect the output current, so as to generate first information which relates to the output current; and a secondary side controller, which is coupled to the current sensing resistor and which is configured to operably retrieve the first information, the secondary side controller being coupled to the output terminal and the feedback circuit and being configured to operably control a current flowing through the feedback circuit according to the output voltage, so as to generate the primary side feedback signal; wherein the secondary side controller retrieves second information which indicates whether there is a substantial amount of energy transmitted to the output terminal according to the current flowing through the feedback circuit; wherein, by checking whether the first information and the second information are contradictory to each other, the secondary side controller determines whether there is a malfunction, the secondary side controller comprising: a current sensing circuit, which is configured to operably generate a current sensing signal indicating the first information according to the output current; a feedback control current sensing circuit, which is configured to operably sense the current flowing through the feedback circuit; a comparison circuit, which is configured to compare the current flowing through the feedback circuit with a current threshold, to generate a determination signal; and a logic determination circuit, which is configured to operably check whether the first information and the second information are contradictory to each other according to the current sensing signal and the determination signal.

From still another perspective, the present invention provides a short circuit determination method for a current sensing resistor for use in a power converter, the power converter being configured to be operably controlled by a power switch, to convert an input voltage to an output voltage at an output terminal of the power converter and supply an output current to the output terminal, and the power converter being configured to sense the output current through a current sensing resistor, the current sensing resistor short circuit determination method comprising: generating an operation signal according to a feedback signal related to the output voltage, so as to control the power switch; detecting the output current through the current sensing resistor so as to generate first information, wherein the first information is related to the output current; generating second information according to an ON time, an OFF time or a switching period of the power switch or according to an energy-releasing period for transmitting energy to the output terminal, wherein the second information indicates whether there is a substantial amount of energy transmitted to the output terminal; and checking whether the first information and the second information are contradictory to each other.

In one embodiment, the power converter further includes a transformer and a rectifier device, the transformer including a primary winding and a secondary winding coupled to each other, the rectifier device being coupled to the secondary winding, and wherein the step of generating the second information includes: determining an ON time, an OFF time or a switching period of the power switch or determining an energy-releasing period for transmitting energy to the output terminal, according to a signal waveform at an end of the rectifier device which is coupled to the secondary winding.

In one embodiment, the power converter further includes a transformer and a synchronous rectifying switch, the transformer including a primary winding and a secondary winding coupled to each other, the synchronous rectifying switch being coupled to the secondary winding, and wherein the step of generating the second information includes: determining an ON time, an OFF time or a switching period of the power switch or determining an energy-releasing period for transmitting energy to the output terminal, according to a gate signal of the synchronous rectifying switch.

From still another perspective, the present invention provides a short circuit determination method for a current sensing resistor for use in a power converter, the power converter comprising: a transformer; a power switch, which is coupled to a primary winding of the transformer, wherein the power switch is configured to be operably turned ON or turned OFF according to an operation signal, to control the primary winding of the transformer, so that the input voltage coupled to the primary winding of the transformer is converted to the output voltage coupled to the secondary winding of the transformer; and a current sensing resistor having one end coupled to a secondary winding of the transformer and another end coupled to the output terminal, the current sensing resistor short circuit determination method comprising: generating an operation signal according to a feedback signal related to the output voltage, so as to control the power switch; detecting the output current through the current sensing resistor so as to generate first information, wherein the first information is related to the output current; generating second information according to the feedback signal, wherein the second information indicates whether there is a substantial amount of energy transmitted to the output terminal; and checking whether the first information and the second information are contradictory to each other.

In one embodiment, the step of generating second information according to the feedback signal includes: sensing a current, wherein the current is for generating the feedback signal; and comparing the current with a current threshold, to generate the second information.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the apparatus and devices, but not drawn according to actual scale.

Figure 1:
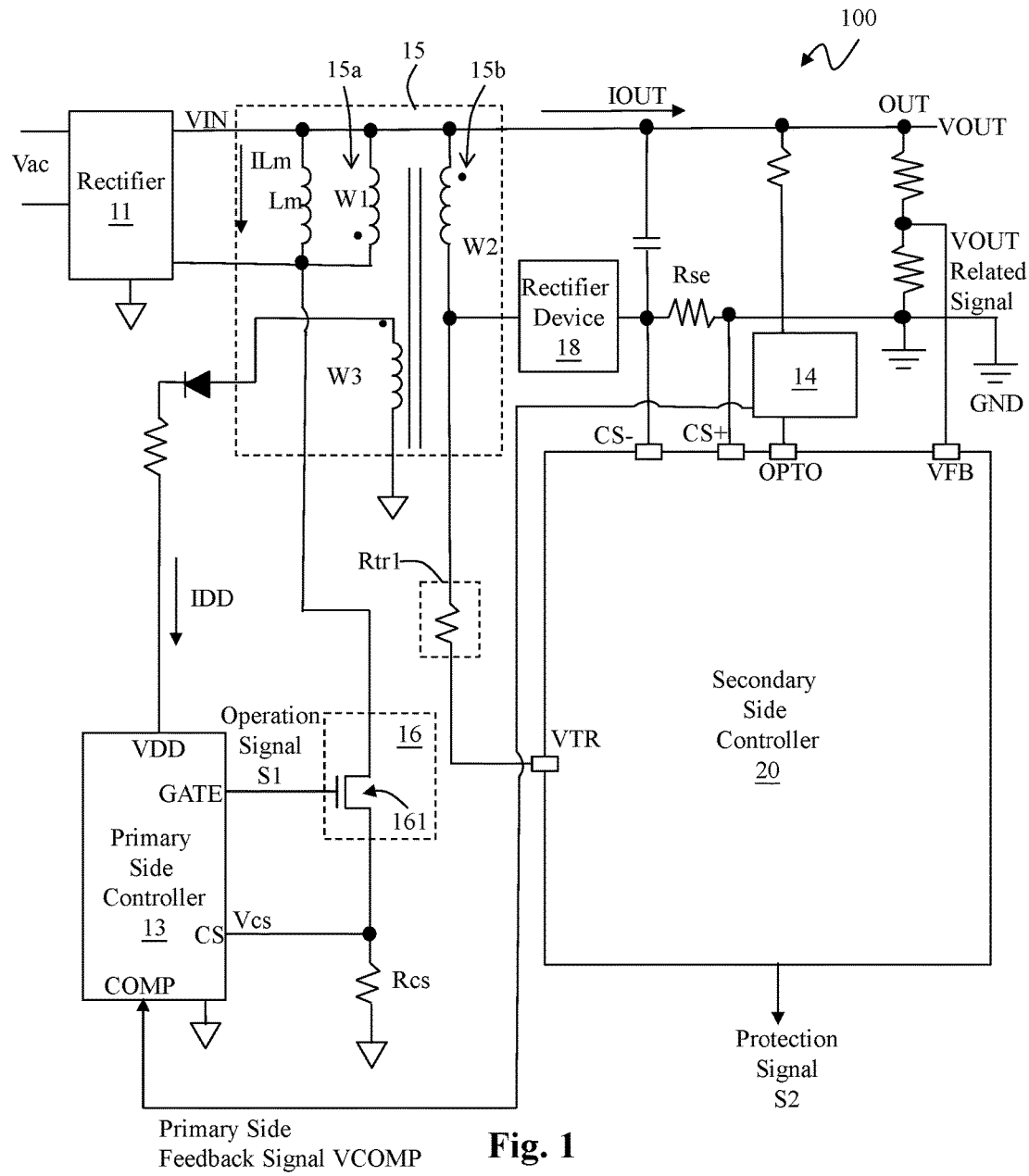
FIG. 1 shows a block diagram of a power converter according to an embodiment of the present invention.
Figure 2:
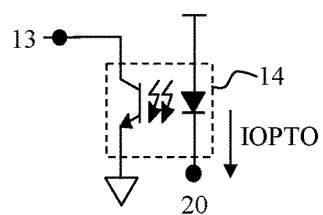
FIG. 2 shows an embodiment of a feedback circuit 14.

Please refer to FIG. 1 and FIG. 2. FIG. 1 shows a block diagram of a power converter according to an embodiment of the present invention. FIG. 2 shows an embodiment of a feedback circuit 14.

In this embodiment, the power converter 100 is for example but not limited to an isolated type AC-DC converter, which can convert an input voltage VIN to an output voltage VOUT at an output terminal OUT of the power converter 100. In this embodiment, the power converter 100 comprises: a transformer 15, a power switch circuit 16, a primary side controller 13, a current sensing resistor Rse, a rectifier device 18, a secondary side controller 20 and a feedback circuit 14 which transmits a signal from the secondary side controller 20 to the primary side controller 13 (or, it may also be viewed that the feedback circuit 14 transmits a signal from a signal from the output terminal OUT to the primary side controller 13).

Because the isolated type AC-DC converter is well known to those skilled in the art, for the sake of simplicity in figures, only circuit details relevant to the present invention are illustrated, while the other circuit details irrelevant to the present invention are omitted.

The transformer 15 includes a primary winding W1 and a secondary winding W2. The primary winding W1 is at a primary side 15a of the transformer 15, for receiving the input voltage VIN. The secondary winding W2 is at a secondary side 15b of the transformer 15, for generating the output voltage VOUT at the output terminal OUT. The secondary side 15b of the transformer 15 forms a current loop to supply an output current IOUT to the output terminal OUT. In one embodiment, the input voltage VIN can be generated via an alternating power supply Vac through a rectifier 11. In one embodiment, the transformer 15 optionally (but not necessarily) further includes an inductor Lm. As shown in FIG. 1, the inductor Lm is connected in parallel to the primary side 15a of the transformer 15 and is coupled to the power switch circuit 16.

The power switch circuit 16 includes at least one power switch 161. The power switch 161 is coupled to the primary winding W1 of the transformer 15 and is turned ON or OFF according to an operation signal S1, to control a current flowing through the primary winding W1, so that the input voltage VIN is converted to the output voltage VOUT through coupling between the primary winding W1 and the secondary winding W2.

The primary side controller 13 is coupled to the power switch 161 of the power switch circuit 16 and is configured to operably generate the operation signal S1 (which is outputted from an operation signal terminal GATE of the primary side controller 13), to control the power switch 161. In this embodiment, the primary side controller 13 is configured to operably generate the operation signal S1 according to a primary side feedback signal VCOMP (which is received from a primary side feedback signal terminal COMP of the primary side controller 13). The primary side controller 13 may generate the operation signal S1 further according to other information in addition to the primary side feedback signal VCOMP. Such other information can be, for example but not limited to, a sensing signal Vcs related to an input current, which is generated by a primary side current sensing resistor Rcs and received by a current sensing terminal CS of the primary side controller 13.

The feedback circuit 14 is controlled by the secondary side controller 20 and is configured to operably generate the primary side feedback signal VCOMP according to the output voltage VOUT. Because the power converter 100 of this embodiment is an isolated type AC-DC converter, in one embodiment, the feedback circuit 14 can be an isolated type feedback circuit which is for example but not limited to an opto-coupling circuit, as shown in FIG. 2. Referring to FIG. 1 and FIG. 2, the secondary side controller 20 controls a current IOPTO flowing through a light emitting diode of the opto-coupling circuit via a pin OPTO, according to the output voltage VOUT; the information related to the output voltage VOUT is received from the pin VFB, which can be regarded as a secondary side feedback signal. A bipolar junction transistor of the opto-coupling circuit senses the light signal emitted by the light emitting diode and generates a current accordingly. The primary side controller 13 converts such current to a corresponding voltage signal, namely, the primary side feedback signal VCOMP.

The current sensing resistor Rse is connected in the current loop formed at the secondary side 15b of the transformer 15 and is configured to operably detect the output current IOUT of the power converter 100, to retrieve first information CI1 related to the output current IOUT. For example, the current sensing resistor Rse can be arranged as thus: one end thereof is coupled to the secondary winding W2 of the transformer 15 and another end thereof is coupled to the output terminal OUT.

Figure 3:
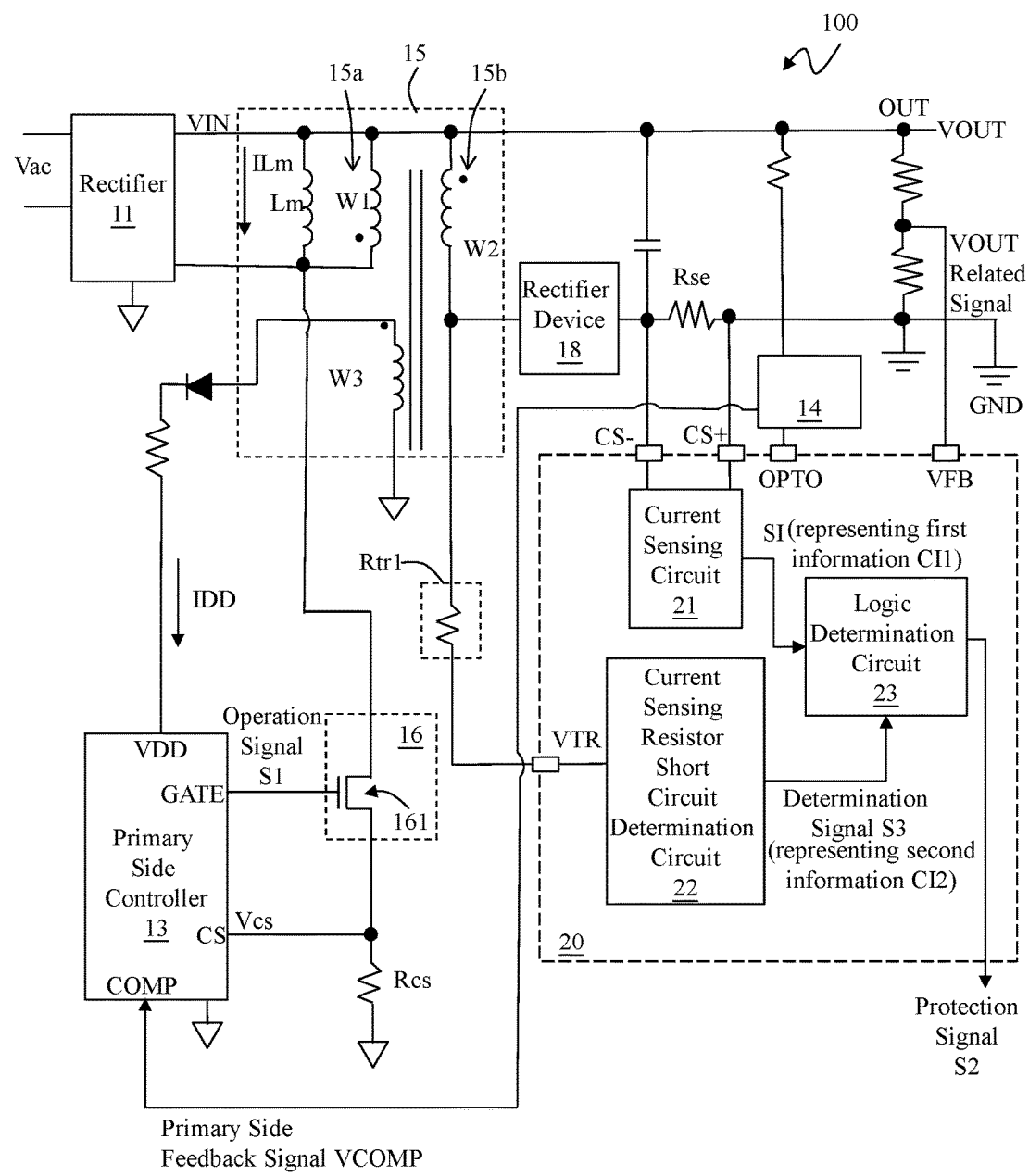
FIG. 3 shows a block diagram of an embodiment of a secondary side controller 20.
Figure 8:
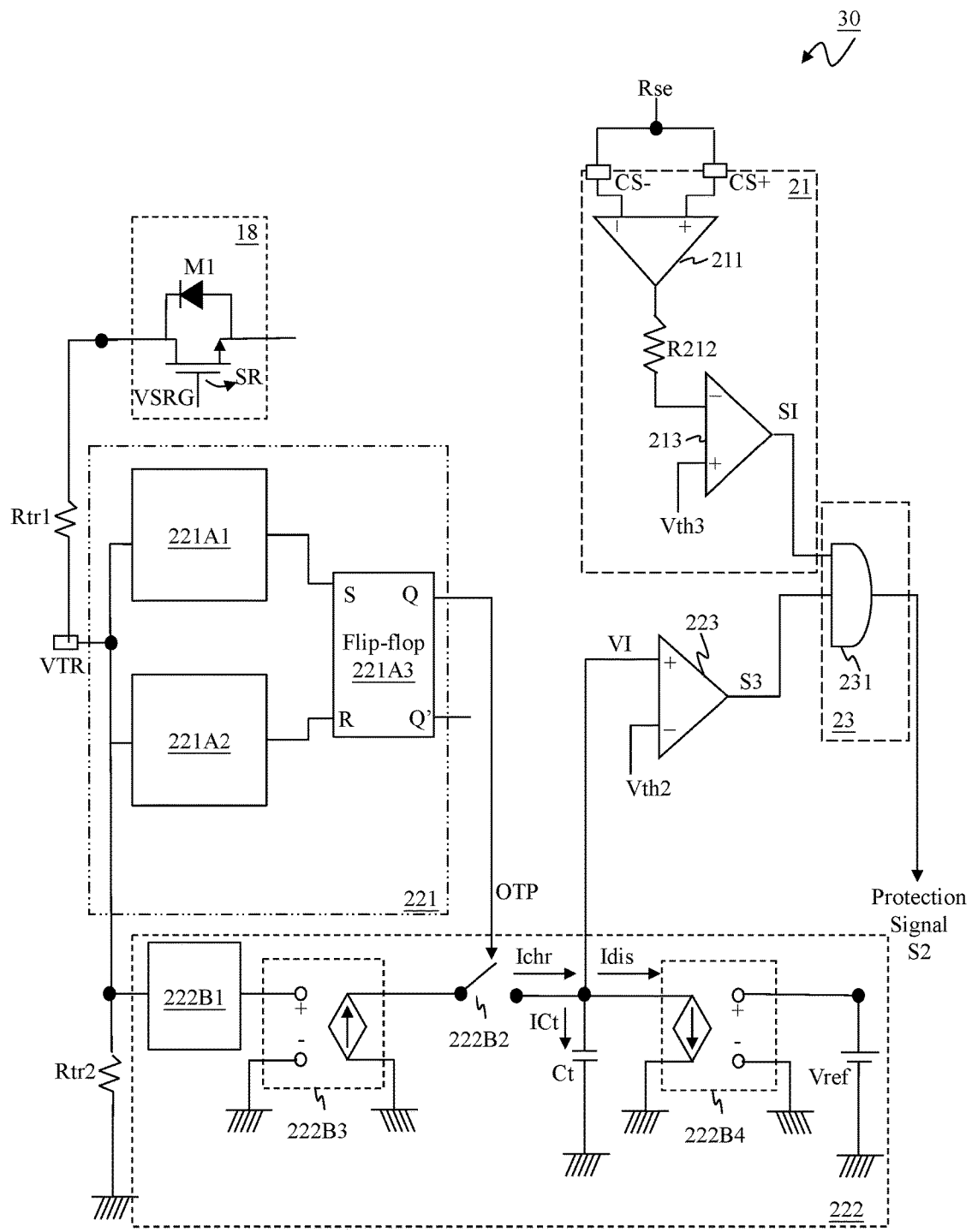
FIG. 8 shows a block diagram of another specific embodiment of a secondary side controller.

The rectifier device 18 is coupled between the secondary winding W2 of the transformer 15 and the current sensing resistor Rse, for controlling a current flow direction of the secondary side 15b. In one embodiment, the rectifier device 18 can be, for example but not limited to, a synchronous rectifying switch (as shown in FIG. 8). A gate of the synchronous rectifying switch is coupled to the secondary side controller 20 and is controlled by a synchronous rectifying switch signal VSRG generated by the secondary side controller 20. In the embodiment of the synchronous rectifying switch shown in FIG. 8, the synchronous rectifying switch has a switch SR connected in parallel with a diode M1. The diode M1 has an anode coupled to the current sensing resistor Rse and a cathode coupled to the secondary winding W2 of the transformer 15. The diode M1 can be an independent diode connected in parallel with the switch SR, or a body diode of the synchronous rectifying switch. In another embodiment, the rectifier device 18 can be, for example but not limited to, a diode, wherein the diode has an anode coupled to the current sensing resistor Rse and a cathode coupled to the secondary winding W2 of the transformer 15. That is, referring to FIG. 8, the rectifier device 18 can include, for example but not limited to, only the diode M1 shown in FIG. 8. Under such circumstance, the secondary side controller 20 does not need to generate the synchronous rectifying switch signal VSRG (FIG. 1 and FIG. 3 show embodiments wherein the secondary side controller 20 does not need to generate the synchronous rectifying switch signal VSRG).

The secondary side controller 20 is coupled to the output terminal OUT and the feedback circuit 14 and is configured to operably control the feedback circuit 14 to generate the primary side feedback signal VCOMP according to the output voltage VOUT. In addition, the secondary side controller 20 is coupled to the current sensing resistor Rse and is configured to operably retrieve the first information CI1. In one embodiment, the secondary side controller 20 is coupled to at least one end of the rectifier device 18 and is configured to operably retrieve second information CI2. The second information CI2 indicates whether there is a substantial amount of energy transmitted to the output terminal OUT. When the first information CI1 and the second information CI2 are contradictory to each other, the secondary side controller 20 will determine that there is a malfunction.

For example, when the first information CI1 indicates that there is no current or there is only few current but the second information CI2 indicates that there is a substantial amount of energy transmitted to the output terminal OUT, the first information CI1 and the second information CI2 are contradictory to each other and it is determined that the current sensing resistor Rse is short-circuited. For another example, when the first information CI1 indicates that there is a substantial amount of current transmitted to the output terminal OUT but the second information CI2 indicates there is no energy or there is only few energy transmitted to the output terminal OUT, the first information CI1 and the second information CI2 are contradictory to each other and it is determined that a malfunction occurs. In another embodiment, the secondary side controller 20 can generate the second information CI2 according to the feedback signal or a signal related to the feedback signal (embodiments as to how the second information CI2 is generated will be described later).

The present invention is different from the prior art in that: in the prior art, if the current sensing resistor Rse is short-circuited and there is actually a substantial amount of output current IOUT transmitted to the output terminal OUT, the first information CI1 detected through the current sensing resistor Rse would be zero or an extremely low level because the current sensing resistor Rse is short-circuited. Under such circumstance, the actual status of the output current IOUT would not be accurately indicated, which might lead to an undesirable dangerous situation.

However, the power converter 100 of the present invention can cross-compare the second information CI2 with the first information CI1. The prior art is unable to identify the actual status of the output current IOUT when the current sensing resistor Rse is short-circuited. The present invention, nevertheless, is able to identify that the current sensing resistor Rse is short-circuited, when the first information CI1 indicates that there is no current or there is only few current but the second information CI2 indicates that there is a substantial amount of energy transmitted to the output terminal OUT, and the present invention can determine whether or not to activate a protection mechanism by, for example but not limited to, issuing a protection signal S2 to trigger one or more of the following actions, such as: issuing an alarm, turning OFF the power switch 161, turning OFF the primary side controller 13, turning OFF the whole circuit of the power converter 100, and/or turning OFF a load circuit connected to the output terminal OUT.

On the other hand, if the first information CI1 indicates that there is a substantial amount of current, but the second information CI2 indicates that there is no energy or there is only few energy transmitted to the output terminal OUT, this also indicates a malfunction and the protection signal S2 can be generated. The malfunction may be caused by: a current leakage via the current sensing resistor Rse; unwanted dusts attached to the current sensing resistor Rse, resulting in an unusually high resistance; an error in retrieving the first information CI1 by the secondary side controller 20; or other reasons. In one embodiment, the protection signal S2 can show different types of malfunctions based upon, for example but not limited to, a cross-comparison result between the second information CI2 and the first information CI1.

Please refer to FIG. 3, which shows a block diagram of an embodiment of a secondary side controller 20. The secondary side controller 20 includes: a current sensing circuit 21, a current sensing resistor short circuit determination circuit 22 and a logic determination circuit 23. The current sensing circuit 21 is configured to operably generate a current sensing signal SI indicating the first information CI1 according to the information sensed through the current sensing resistor Rse. The current sensing resistor short circuit determination circuit 22 is configured to operably generate a determination signal S3. The determination signal S3 indicates whether there is a substantial amount of energy transmitted to the output terminal OUT, thereby indicating the second information CI2 (the relevant details as to how the current sensing resistor short circuit determination circuit 22 generates the determination signal S3 will be explained later).

In one embodiment, when the rectifier device 18 is a synchronous rectifying switch, the second information CI2 can be determined according to, for example but not limited to, a gate signal of the synchronous rectifying switch, or a voltage difference between a source and a drain of the synchronous rectifying switch, or a control signal of the feedback circuit 14. In another embodiment, when the rectifier device 18 is a diode, the second information CI2 can be determined according to, for example but not limited to, a voltage difference across the diode or the control signal of the feedback circuit 14. As shown in FIG. 3, the current sensing resistor short circuit determination circuit 22 is coupled to a pin VTR. That is, the current sensing resistor short circuit determination circuit 22 is coupled to one end of the rectifier device 18 (e.g., the left end shown in FIG. 3). Because another end of the rectifier device 18 (e.g., the right end shown in FIG. 3) is coupled to ground through the current sensing resistor Rse and the voltage drop across the current sensing resistor Rse is known, a voltage difference between the left and right ends of the rectifier device 18 can be obtained by simply retrieving the voltage at the pin VTR. When the rectifier device 18 is a synchronous rectifying switch and when the second information CI2 needs to be determined according to a gate signal of the synchronous rectifying switch, because the gate signal of the synchronous rectifying switch is generated by the secondary side controller 20, the information regarding the gate signal of the synchronous rectifying switch can be directly obtained from an internal circuit of the secondary side controller 20.

More specifically, the gate signal of the synchronous rectifying switch, a voltage difference between the source and the drain of the synchronous rectifying switch, or the voltage difference across the diode, all of the above signals can directly or indirectly show an ON time, an OFF time, a switching period or a switching frequency of the power switch 161, or an energy-releasing period of the secondary winding W2 of the transformer 15. When the power switch 161 is ON, the primary winding W1 of the transformer 15 is ON, and the secondary winding W2 is storing energy. Under such circumstance, because there is no current flowing through the current loop at the secondary side of the transformer 15, there is no voltage difference between the source and the drain of the synchronous rectifying switch, or between two ends of the diode. On the other hand, when the power switch 161 is OFF, the secondary winding W2 is releasing energy. Under such circumstance, because there is a current flowing through the current loop at the secondary side of the transformer 15, there is a voltage difference between the source and the drain of the synchronous rectifying switch, or between two ends of the diode. Because the gate signal of the synchronous rectifying switch is complementary to the operation signal S1 of the power switch 161, the gate signal of the synchronous rectifying switch is also able to show an ON time, an OFF time, a switching period or a switching frequency of the power switch 161 or an energy-releasing period of the secondary winding W2 of the transformer 15.

It should be noted that, under a continuous conduction mode (CCM), the time point when the secondary winding W2 cease releasing energy is consistent with the time point when the primary winding W1 is turned ON. That is, the OFF period of the power switch 161 is consistent with the energy-releasing period of the secondary winding W2. However, under a discontinuous conduction mode (DCM), after the secondary winding W2 has ceased releasing energy, the primary winding W1 is not turned ON immediately. Under such circumstance, the OFF period of the power switch 161 would not be consistent with the energy-releasing period of the secondary winding W2. Nevertheless, regardless whether the OFF period of the power switch 161 is or is not consistent with the energy-releasing period of the secondary winding W2, the length (duration) of the corresponding period can be determined based upon the gate signal of the synchronous rectifying switch, the voltage difference between the source and the drain of the synchronous rectifying switch or the voltage difference across the diode.

The power switch 161 can be operated under a constant frequency mode or a variable frequency mode; the present invention is not limited to any one of these modes. Regardless of the frequency mode, it can be determined as to whether there is a substantial amount of energy transmitted to the output terminal OUT according to the ON time, the OFF time, the switching period or the switching frequency of the power switch 161, or the energy-releasing period of the secondary winding W2 of the transformer 15. For example, under a constant frequency mode, if an ON time of the power switch 161 is longer than a certain reference length or if an OFF time of the power switch 161 is shorter than a certain reference length, it can be determined that there is a substantial amount of energy transmitted to the output terminal OUT. For another example, under a variable frequency mode wherein the ON time is a constant, if the switching period of the power switch 161 is shorter than a certain reference length or a switching frequency of the power switch 161 is faster than a certain reference frequency or an OFF time of the power switch 161 is shorter than a certain reference length, it can be determined that there is a substantial amount of energy transmitted to the output terminal OUT. For still another example, under a variable frequency mode wherein the OFF time is a constant, if the ON time of the power switch 161 is longer than a certain reference length or a switching period of the power switch 161 is longer than a certain reference length or a switching frequency of the power switch 161 is slower than a certain reference frequency, it can be determined that there is a substantial amount of energy transmitted to the output terminal OUT. Or, regardless whether the power switch 161 is operated under a constant frequency mode or a variable frequency mode, if an energy-releasing period of the secondary winding W2 of the transformer 15 is longer than a certain reference length, it can be determined that there is a substantial amount of energy transmitted to the output terminal OUT.

The approach for generating the second information CI2 is not limited to generating the second information CI2 according to signals associated with the rectifier device 18. When it is required to transmit a substantial amount of energy to the output terminal OUT, the feedback circuit 14 will accordingly show corresponding information. Therefore, the present invention can also generate the second information CI2 according to a control signal which controls the feedback circuit 14.

The logic determination circuit 23 is configured to operably check whether the first information CI1 and the second information CI2 are contradictory to each other according to the current sensing signal SI and the determination signal S3. When it is determined that the first information CI1 and the second information CI2 are contradictory to each other, the logic determination circuit 23 issues a corresponding protection signal S2, to show corresponding information.

Figure 4:
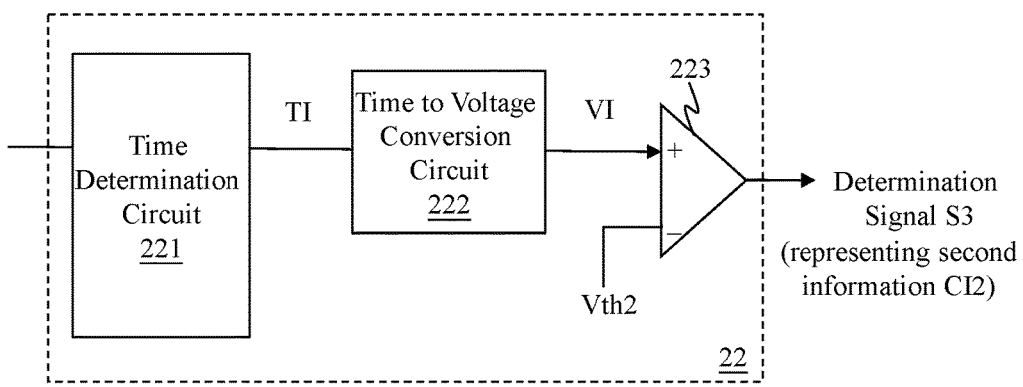
FIG. 4 shows a block diagram of an embodiment of a current sensing resistor short circuit determination circuit 22.

Please refer to FIG. 4, which shows a block diagram of an embodiment of a current sensing resistor short circuit determination circuit 22. The current sensing resistor short circuit determination circuit 22 includes: a time determination circuit 221, a time to voltage conversion circuit 222 and a comparator 223. The time determination circuit 221 is configured to operably obtain the ON time, the OFF time or the switching period of the power switch 161 according to the above-mentioned gate signal of the synchronous rectifying switch, the above-mentioned voltage difference between the source and the drain of the synchronous rectifying switch or the above-mentioned voltage difference across the diode, to generate time information TI. The time to voltage conversion circuit 222 is configured to operably generate voltage information VI corresponding to the time information TI according to the time information TI generated by the time determination circuit 221. The comparator 223 is configured to operably compare the voltage information VI with a voltage threshold Vth2, so as to generate the determination signal S3, indicating whether there is a substantial amount of energy transmitted to the output terminal OUT (i.e., indicating the second information CI2). The voltage threshold Vth2 can be set, depending upon which time information is adopted to be compared with (the ON time, the OFF time or the switching period of the power switch 161). The positive and negative input terminals of the comparator 223 can also be correspondingly set. The voltage threshold Vth2 corresponds to the above-mentioned reference lengths which are to be compared with the ON time, the OFF time or the switching period. Because frequency is a reciprocal of period, the switching period may be converted to frequency for comparison.

Figure 5:
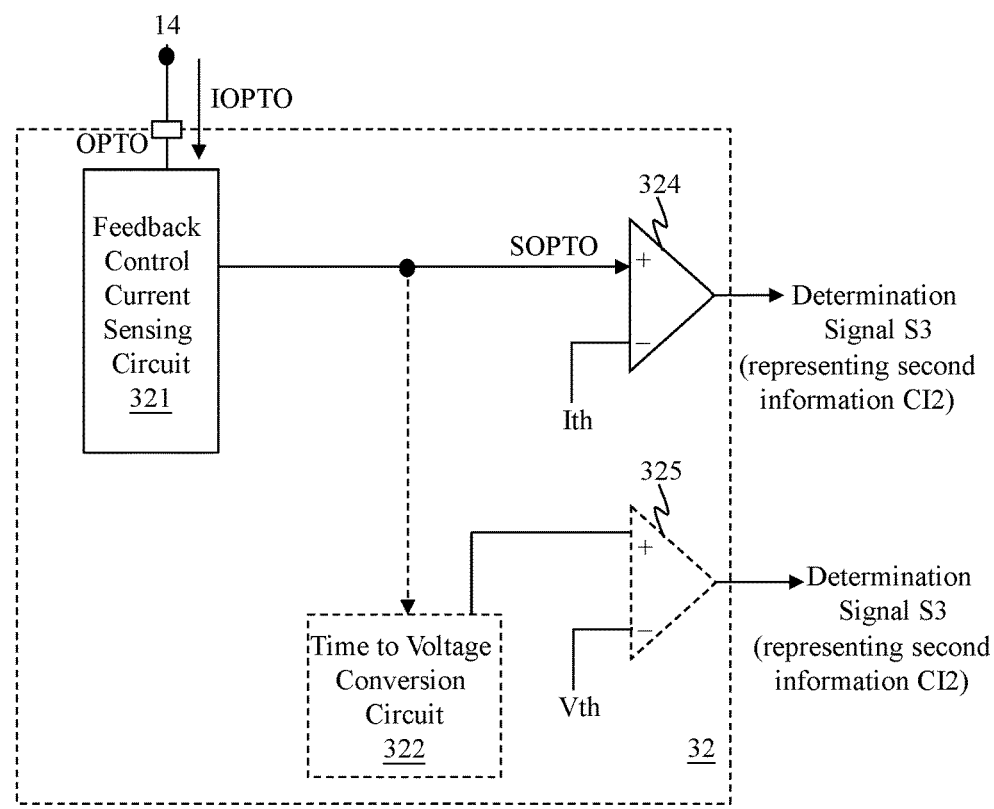
FIG. 5 shows a block diagram of another embodiment of a current sensing resistor short circuit determination circuit 32.

Please refer to FIG. 5, which shows a block diagram of another embodiment of a current sensing resistor short circuit determination circuit 32.

The embodiment shown in FIG. 4 shows that the second information CI2 can be generated according to signals associated with the rectifier device 18, whereas the embodiment shown in FIG. 5 shows that the second information CI2 can be generated according to a control signal which controls the feedback circuit 14.

In the embodiment shown in FIG. 5, the current sensing resistor short circuit determination circuit 32 includes: a feedback control current sensing circuit 321 and a comparator 324. As described above, when the feedback circuit 14 is an opto-coupling circuit, the secondary side controller 20 controls a current IOPTO flowing through a light emitting diode of the opto-coupling circuit via the pin OPTO, according to the output voltage VOUT. In other words, the current IOPTO can be regarded as a "feedback control current", wherein the level of the current IOPTO corresponds to the level of the feedback signal; hence, the current IOPTO may be employed to determine whether there is a substantial amount of energy transmitted to the output terminal OUT. The feedback control current sensing circuit 321 receives the current IOPTO via the pin OPTO and generates a current related signal SOPTO according to the current IOPTO. The comparator 324 compares the current related signal SOPTO with a current threshold Ith, to determine whether the current related signal SOPTO is greater than the current threshold Ith.

In one embodiment, the above-mentioned comparison between the currents can be converted to a comparison between the voltages. As shown in FIG. 5, in one embodiment, a current-to-voltage conversion circuit 322 may be adopted to convert the current signal to a voltage signal. A comparator 325 may be adopted to compare the converted signal SOPTO (which is a voltage signal) with a voltage threshold Vth.

In brief, the above comparison indicates: whether the feedback signal demands the primary side controller 13 to control the power switch 161 so as to transmit a substantial amount of energy to the output terminal OUT. If the feedback signal indeed demands so (in this case the second information CI2 indicates that there is a substantial amount of energy transmitted to the output terminal OUT, which is shown by the determination signal S3 outputted from the comparator 324 or 325), but the first information CI1 indicates that there is no current or there is only few current, the logic determination circuit 23 will issue a corresponding protection signal S2 according to the contradiction between the first information CI1 and the second information CI2, to show this information.

Figure 6A:
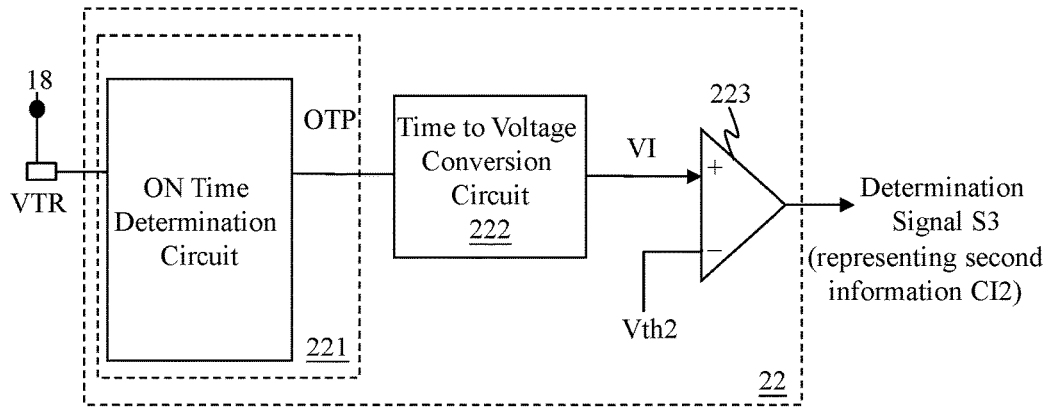
FIG. 6A-6C show block diagrams of different embodiments of time determination circuit 221.
Figure 6B:
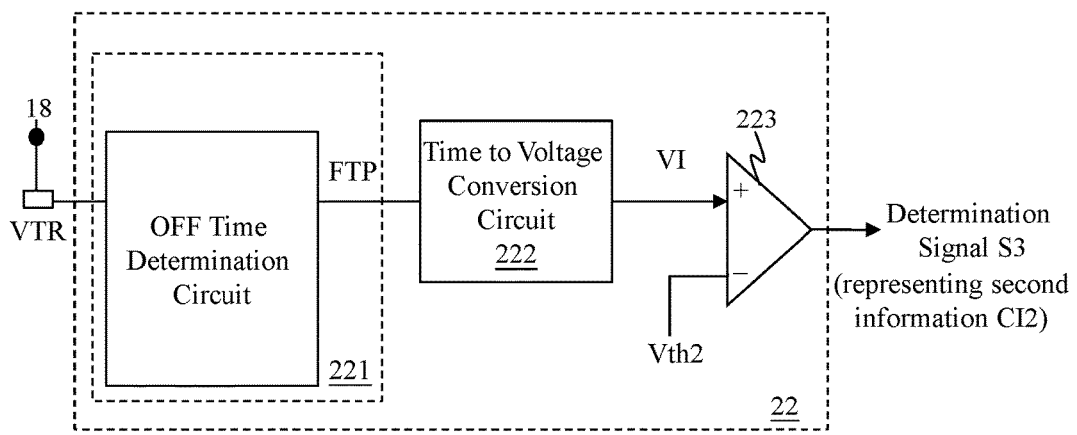
Figure 6C:
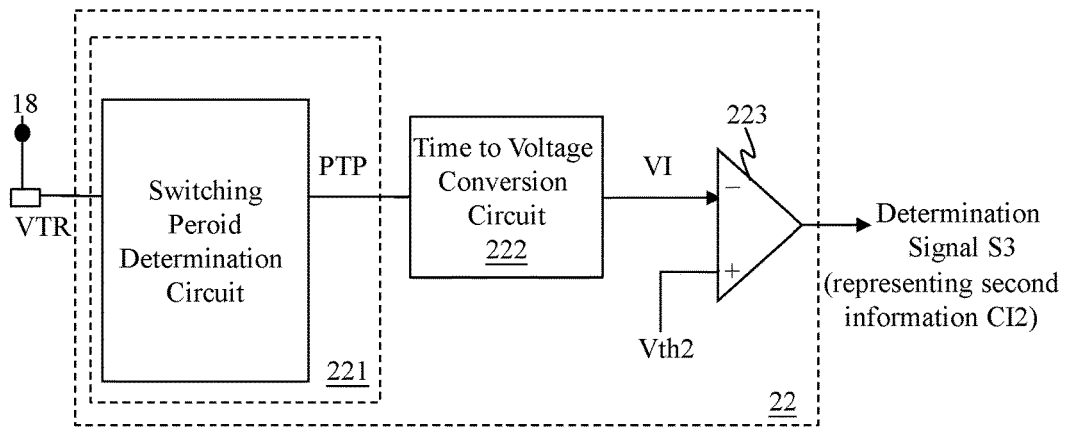

FIG. 6A-6C show that: the time determination circuit 221 can be, for example but not limited to, an ON time determination circuit, an OFF time determination circuit, or a switching period determination circuit. The time information TI can be, for example but not limited to, ON time information OTP (may include or not include its complementary signal OTP'), OFF time information FTP (may include or not include its complementary signal FTP') or switching period information PTP (may include or not include its complementary signal PTP').

Figure 7:
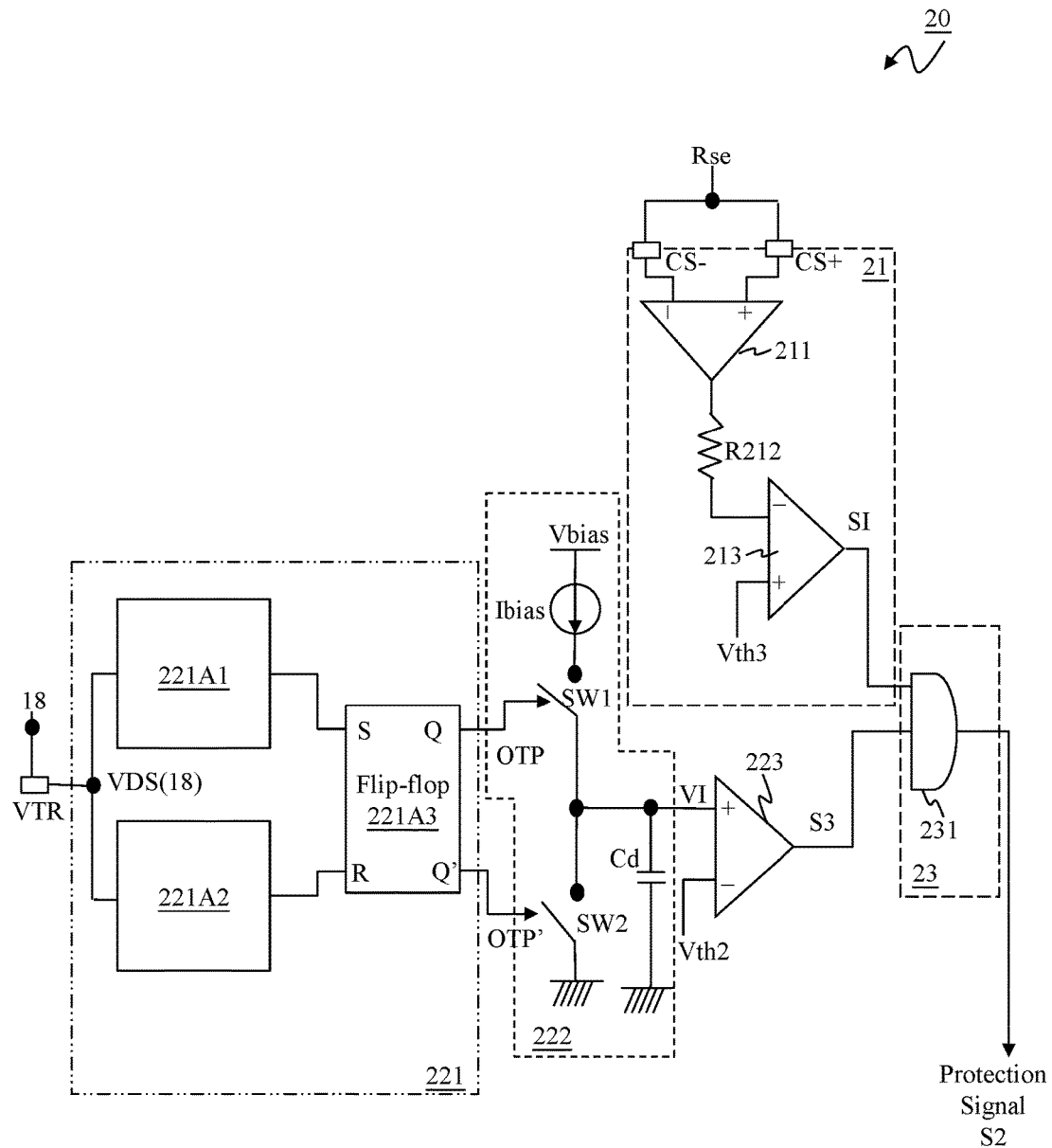
FIG. 7 shows a block diagram of a specific embodiment of a secondary side controller.
Figure 9:
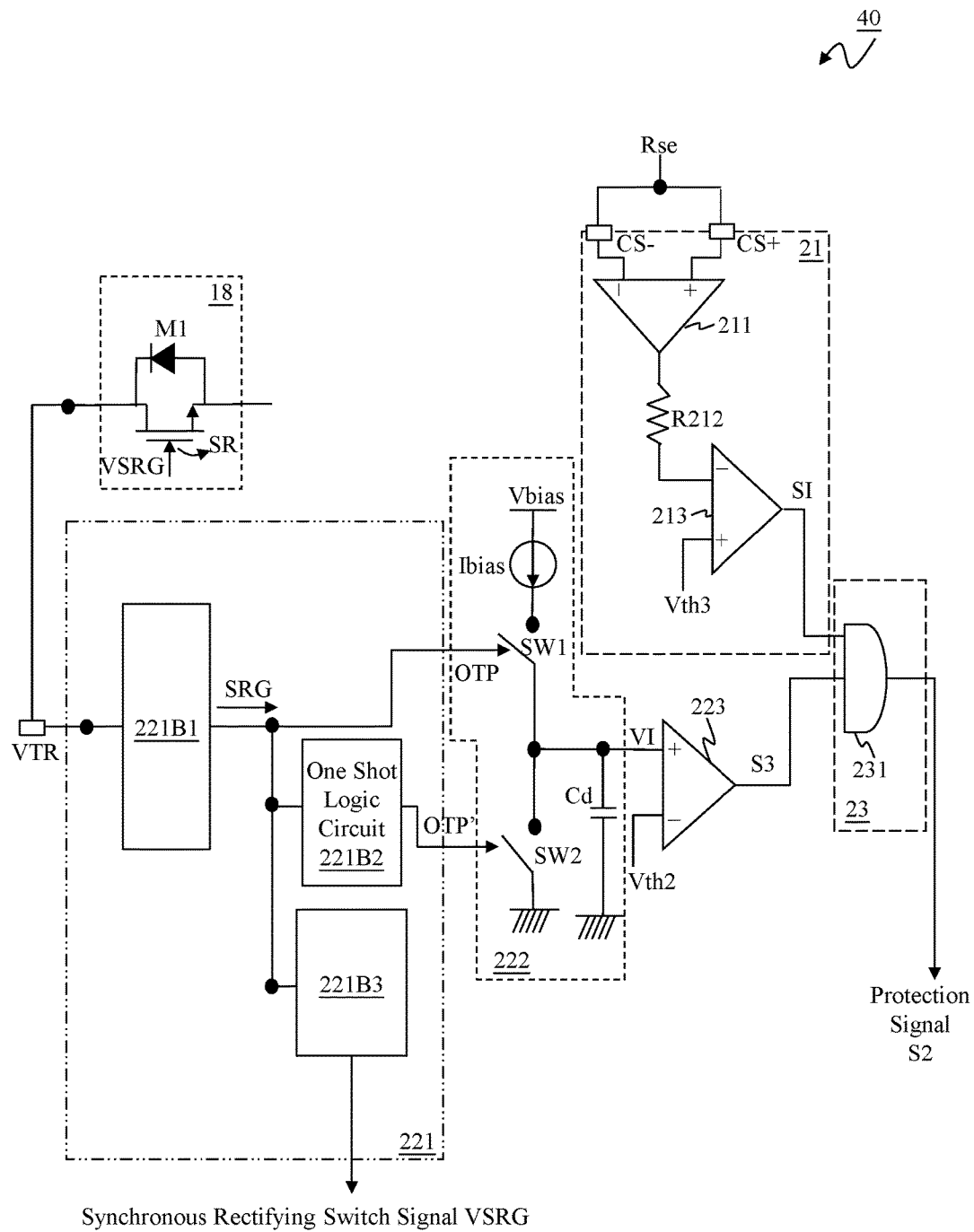
FIG. 9 shows a block diagram of yet another specific embodiment of a secondary side controller.
Figure 10A:
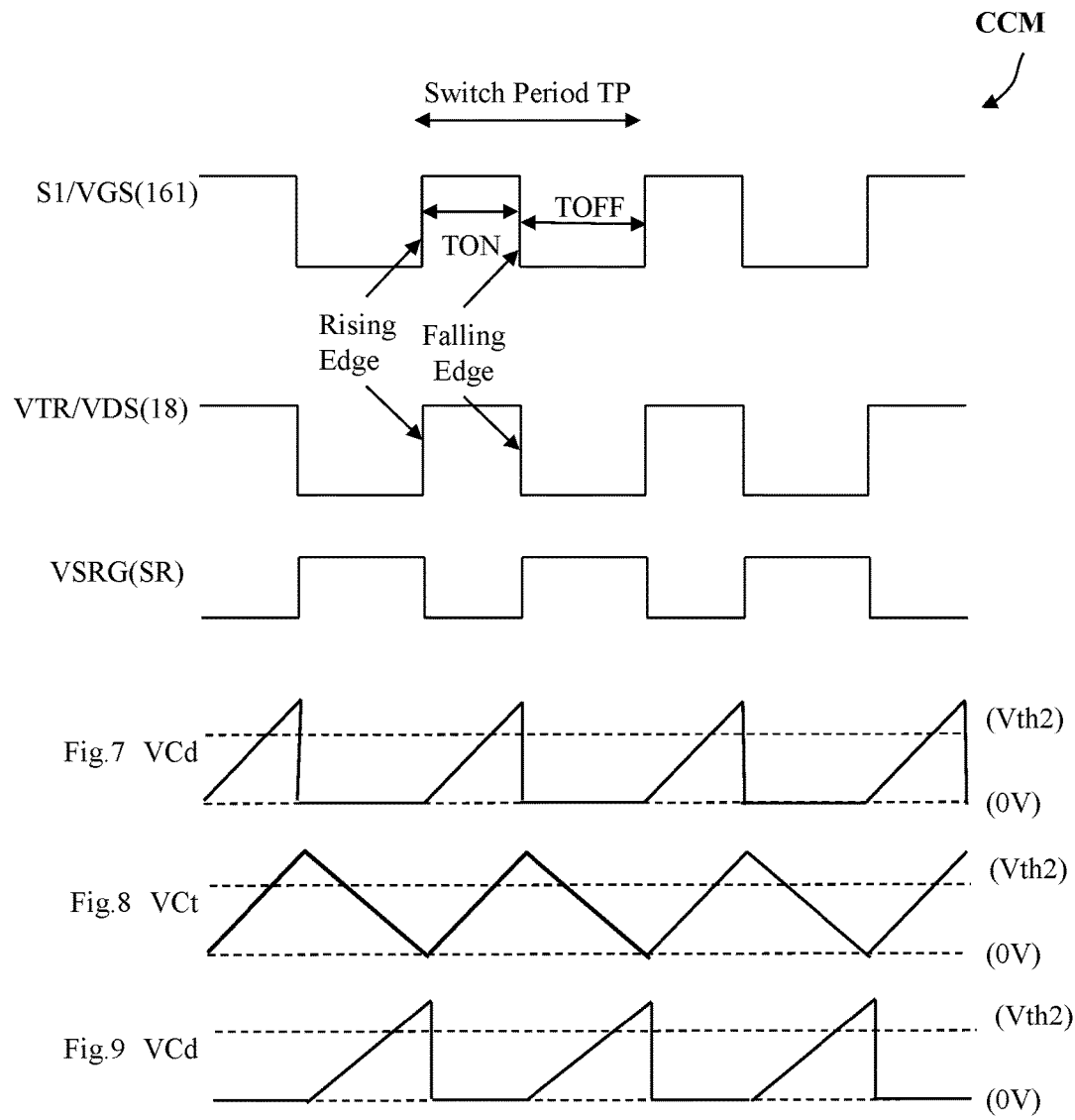
FIG. 10A shows, in correspondence with FIG. 7 to FIG. 9, a waveform diagram of the present invention under continuous conduction mode (CCM) operation.
Figure 10B:
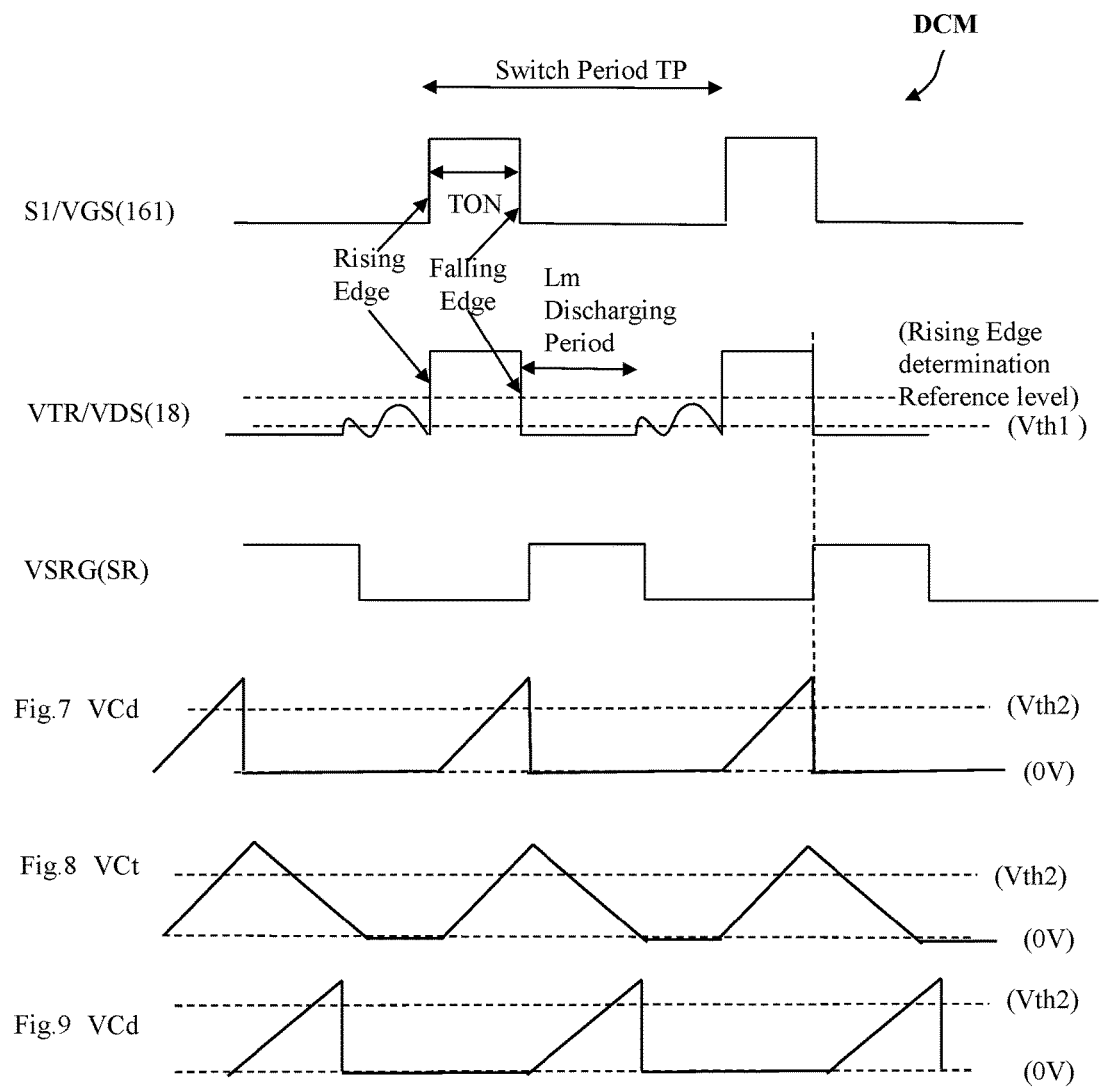
FIG. 10B shows, in correspondence with FIG. 7 to FIG. 9, a waveform diagram of the present invention under discontinuous conduction mode (DCM) operation.

Please refer to FIG. 7 together with FIG. 10A and FIG. 10B. FIG. 7 shows a block diagram of a specific embodiment of a secondary side controller. FIG. 10A shows, in correspondence with FIG. 7 to FIG. 9, a waveform diagram of the present invention under continuous conduction mode (CCM) operation. FIG. 10B shows, in correspondence with FIG. 7 to FIG. 9, a waveform diagram of the present invention under discontinuous conduction mode (DCM) operation.

As shown in FIG. 7, in one embodiment, the time determination circuit 221 of the current sensing resistor short circuit determination circuit 22 includes, for example but not limited to, a voltage waveform rising edge detection circuit 221A1, a voltage waveform falling edge detection circuit 221A2 and a SR type flip-flop 221A3. In this embodiment, the waveform of the voltage across the rectifier device 18 can be obtained by measuring, for example but not limited to, a voltage at the left end of the rectifier device 18 (this information can be obtained through the pin VTR of the secondary side controller 20). The following description is based on the example that the rectifier device 18 is a synchronous rectifying switch. Accordingly, the waveform of the voltage across the rectifier device 18 is the waveform of the drain-to-source voltage of the synchronous rectifying switch (as shown by VDS (18) in FIG. 10A and FIG. 10B). If the rectifier device 18 is a diode, the same principle can also be applied except that the waveform of the voltage across the rectifier device 18 is the waveform of the voltage across the diode. When the power switch 161 at the primary side is ON (as shown by VGS(161) and TON in FIG. 10A and FIG. 10B, wherein VGS(161) shows the waveform of the gate-to-source voltage of the power switch 161, which also corresponds to the waveform of the operation signal S1), the secondary winding W2 stores energy, and there is no current flowing through the current loop at the secondary side, so the voltage at the pin VTR is zero. When the power switch 161 is OFF, the secondary winding W2 releases energy, to generate a current flowing through the current loop at the secondary side, so the voltage at the pin VTR is negative (because the right end of the rectifier device 18 is coupled to ground). In other words, the waveform obtained from the pin VTR is similar to the waveform of the power switch 161, which can thus be used to calculate the ON time of the power switch 161.

More specifically, the time determination circuit 211 obtains a voltage waveform rising edge and a voltage waveform falling edge of the pin VTR through the voltage waveform rising edge detection circuit 221A1 and the voltage waveform falling edge detection 221A2, respectively. The results outputted from the voltage waveform rising edge detection circuit 221A1 and the voltage waveform falling edge detection 221A2 are inputted into the S and R input terminals of the SR type flip-flop 221A3, respectively. The SR type flip-flop 221A3 generates ON time information OTP according to the voltage waveform rising edge and voltage waveform falling edge, and the ON time information OTP is then transmitted to the time to voltage conversion circuit 222.

The time to voltage conversion circuit 222 is coupled between the time determination circuit 221 and the comparator 223, and is configured to operably perform time-to-voltage conversion on the received ON time information OTP. After the time-to-voltage conversion, the thus converted ON time information OTP is outputted to the comparator 223. The time to voltage conversion circuit 222 can be implemented by various hardware configurations; FIG. 7 shows one possible implementation, and those skilled in this art can conceive many equivalents under the teaching by the present invention. For example, in one embodiment, the time to voltage conversion circuit 222 can include, for example but not limited to, a voltage source Vbias, a current source Ibias, a switch SW1, a switch SW2 and a capacitor Cd. When the voltage waveform rising edge of the pin VTR is detected, the switch SW1 is turned ON while the switch SW2 is turned OFF. Accordingly, the current source Ibias charges the capacitor Cd, whereby the voltage VCd across the capacitor Cd has a ramp waveform. On the other hand, when the voltage waveform falling edge of the pin VTR is detected, the switch SW2 is turned ON while the switch SW1 is turned OFF. Accordingly, the voltage VCd drops to zero, and the capacitor Cd is discharged. Consequently, the voltage VCd across the capacitor Cd has the waveform shown in FIG. 10A and FIG. 10B, thereby providing the voltage information VI. The comparator 223 can compare the voltage information VI (indicating the ON time of the power switch 161) with the voltage threshold Vth2, to determine whether there is a substantial amount of energy transmitted to the output terminal OUT. That is, the comparator 223 can generate the determination signal S3 to represent the second information CI2.

Please still refer to FIG. 7. The first information CI1 is generated according to the sensing result of the current sensing resistor Rse with regard to the output current IOUT. There are various ways to generate the first information CI1; FIG. 7 shows one possible hardware implementation, and those skilled in this art can conceive many equivalents under the teaching by the present invention. In one embodiment, the current sensing circuit 21 can include, for example but not limited to, an operational amplifier 211 and a comparator 213 and can optionally include a resistor R212 for fine-tuning the signal. The current sensing circuit 21 receives the voltage across the current sensing resistor Rse via a pin CS+ and a pin CS− of the secondary side controller 20. The received voltage is amplified through the operational amplifier 211 and then inputted to the comparator 213. The comparator 213 compares the amplified voltage signal (indicating the level of the output current IOUT) with a voltage threshold Vth3, to determine the status of the output current IOUT. This is the first information CI1. The voltage threshold Vth3 can be set depending upon the practical circuit design.

The current sensing signal SI (indicating the first information CI1) generated by the comparator 213 is inputted into the logic determination circuit 23. Also, the determination signal S3 (indicating the second information CI2) generated by the comparator 213 is inputted into the logic determination circuit 23. In one embodiment, the logic determination circuit 23 can include, for example but not limited to, an AND gate 231 (if the positive and negative input terminals of the comparator 213 and/or the comparator 223 are interchanged, another type of logic gate should be adopted). The AND gate 231 checks whether the current sensing signal SI (the first information CI1) and the determination signal S3 (the second information CI2) are contradictory to each other, so as to issue a corresponding protection signal S2. In this embodiment, the logic determination circuit 23 is an AND gate 231, to simply show whether "the first information CI1 indicates that there is no current or there is only few current" but "the second information CI2 indicates that there is a substantial amount of energy transmitted to the output terminal OUT". Such contradiction between the first information CI1 and the second information CI2 indicates that an undesired short circuit has occurred in the current sensing resistor Rse. If it is necessary to show other types of contradictions, the logic determination circuit 23 can be implemented as a more complicated circuit, to generate a multi-bit signal indicating the type of contradiction.

Please refer to FIG. 8 together with FIG. 10A and FIG. 10B. FIG. 8 shows a block diagram of another specific embodiment of a secondary side controller 30.

As shown in FIG. 8, the time determination circuit 221 of the current sensing resistor short circuit determination circuit 22 can include, for example but not limited to, a voltage waveform rising edge detection circuit 221A1, a voltage waveform falling edge detection circuit 221A2 and a SR type flip-flop 221A3. In this embodiment, the waveform of the voltage across the rectifier device 18 can be obtained by measuring, for example but not limited to, a voltage at the left end of the rectifier device 18 (this information can be obtained through the pin VTR of the secondary side controller 20). This embodiment detects a divided voltage of the voltage at the left end of the rectifier device 18 via a voltage divider (formed by a resistor Rtr1 and a resistor Rtr2), which also corresponds to VDS(18) shown in FIG. 10A and FIG. 10B.

The time to voltage conversion circuit 222 is coupled between the time determination circuit 221 and the comparator 223 and is configured to operably perform time-to-voltage conversion on the received ON time information OTP. After the time-to-voltage conversion, the converted ON time information OTP is outputted to the comparator 223. This embodiment shows another hardware configuration of the time to voltage conversion circuit 222. For example, in this embodiment, the time to voltage conversion circuit 222 can include, for example but not limited to, a sample-and-hold circuit 222B1, a switch 222B2, a capacitor Ct, a voltage control current source 222B3 and a voltage control current source 222B4. The sample-and-hold circuit 222B1 is configured to operably sample-and-hold a voltage obtained from the pin VTR, to generate a sample-and-hold voltage, and control the voltage control current source 222B3 accordingly. The ON time information OTP controls the switch 222B2. When the switch 222B2 is ON, the voltage control current source 222B3 charges the capacitor Ct with a charging current Ichr, whereby the capacitor Ct generates a ramp voltage VCt. When the switch 222B2 is OFF, the capacitor Ct is discharged by a discharging current Idis, which is controlled by the voltage control current source 222B4. Consequently, the voltage VCt of the capacitor Ct has the waveform shown in FIG. 10A and FIG. 10B, thereby providing the voltage information VI. The comparator 223 compares the voltage information VI (indicating the ON time of the power switch 161) with the voltage threshold Vth2, to determine whether there is a substantial amount of energy transmitted to the output terminal OUT. That is, the comparator 223 can generate the determination signal S3 to represent the second information CI2.

In certain applications, as required by other functions (e.g., for calculating when the synchronous rectifying switch should be ON and OFF), the secondary side controller 20 inherently includes the sample-and-hold circuit 222B1, the switch 222B2, the capacitor Ct, the voltage control current source 222B3 and the voltage control current source 222B4. In this case, this embodiment can employ the circuits inherently included in the secondary side controller 20 to achieve the purpose of the present invention, thus saving the manufacturing cost of the hardware.

The logic determination circuit 23 and the current sensing circuit 21 of this embodiment operate according to substantially the same mechanism as the logic determination circuit 23 and the current sensing circuit 21 of the embodiment shown in FIG. 7, so they have substantially the same advantages and efficacies as the embodiment shown in FIG. 7, which are not redundantly repeated here.

In the embodiments shown in FIG. 7 and FIG. 8, the ON time of the power switch 161 is determined according to a voltage difference across the rectifier device 18 or the voltage at the left end of the rectifier device 18. By the same principle, the OFF time or the switching period of the power switch 161 can also be determined according to a voltage difference across the rectifier device 18 or the voltage at the left end of the rectifier device 18. More specifically, the ON time of the power switch 161 is defined as a period between a rising edge and a falling edge of the voltage waveform obtained from the pin VTR. The OFF time of the power switch 161 is defined as a period between a falling edge and a rising edge of the voltage waveform obtained from the pin VTR. The switching period of the power switch 161 is defined as a period between two rising edges of the voltage waveform obtained from the pin VTR or a sum of the ON time and the OFF time.

Please refer to FIG. 9 together with FIG. 10A and FIG. 10B. FIG. 9 shows a block diagram of yet another specific embodiment of a secondary side controller 40.

In the embodiments shown in FIG. 7 and FIG. 8, the ON time of the power switch 161 is determined according to a voltage difference across the rectifier device 18 or the voltage at the left end of the rectifier device 18. Nevertheless, in the embodiment shown in FIG. 9 wherein the rectifier device 18 is a synchronous rectifying switch, the ON time of the power switch 161 may be determined according to a gate signal of the synchronous rectifying switch. As shown in FIG. 9, in order to control the synchronous rectifying switch, the secondary side controller 40 includes: a synchronous rectifying switch control unit 221B1 and a synchronous rectifying switch driver gate 221B3. The time determination circuit 221 can be regarded as including the synchronous rectifying switch control unit 221B1, a one shot logic circuit 221B2 and the synchronous rectifying switch driver gate 221B3, or including only the one shot logic circuit 221B2. The time determination circuit 221 of this embodiment can obtain the ON time information OTP corresponding to the ON time of the power switch 161 by measuring a waveform of the gate signal VSRG (hereinafter "the synchronous rectifying switch signal") of the synchronous rectifying switch (as shown by VSRG(SR) in FIG. 10A and FIG. 10B).

More specifically, the synchronous rectifying switch control unit 221B1 receives the voltage at the left end of the rectifier device 18 (i.e., the synchronous rectifying switch) through the pin VTR of the secondary side controller 40, to determine whether to turn ON the synchronous rectifying switch, and generate a corresponding initial synchronous rectifying switch signal SRG. The initial synchronous rectifying switch signal SRG is converted to an appropriate level (i.e., the synchronous rectifying switch signal VSRG) via the synchronous rectifying switch driver gate 221B3, to drive the synchronous rectifying switch. If the signal operation levels internal to and external to the secondary side controller 40 are approximately equal, the synchronous rectifying switch driver gate 221B3 can be omitted. Because the meaning of the initial synchronous rectifying switch signal SRG is equivalent to the meaning of the synchronous rectifying switch signal VSRG, the initial synchronous rectifying switch signal SRG and the synchronous rectifying switch signal VSRG can be viewed as one same signal.

On the other hand, the falling edge of the initial synchronous rectifying switch signal SRG triggers a single pulse via the one shot logic circuit 221B2.

In this embodiment, while the power switch 161 at the primary side is ON, the rectifier device 18 (i.e., the synchronous rectifying switch) at the secondary side is OFF. On the other hand, while the rectifier device 18 at the secondary side is ON, the power switch 161 at the primary side is OFF (please compare VGS(161) and VSRG(SR) shown in FIG. 10A and FIG. 10B).

In one embodiment, the time to voltage conversion circuit 222 can include, for example but not limited to, a voltage source Vbias, a current source Ibias, a switch SW1, a switch SW2 and a capacitor Cd. In other words, the time to voltage conversion circuit 222 of this embodiment is substantially the same as the time to voltage conversion circuit 222 shown in FIG. 7. The time to voltage conversion circuit 222 is coupled between the time determination circuit 221 and the comparator 223 and is configured to operably perform time-to-voltage conversion on the received ON time information OTP. After the time-to-voltage conversion, the converted ON time information OTP is outputted to the comparator 223. When the synchronous rectifying switch signal VSRG is ON, the switch SW1 is ON while the switch SW2 is OFF. The current source Ibias charges the capacitor Cd to generate a voltage VCd having a ramp waveform across the capacitor Cd. On the other hand, when the switch SW2 is ON, the switch SW1 is OFF; the voltage VCd of the capacitor Cd drops to zero. Consequently, through ON/OFF of the switch SW1 and the switch SW2, the voltage VCd of the capacitor Cd has the waveform shown in FIG. 10A and FIG. 10B, thereby providing the voltage information VI.

The comparator 223 compares the voltage information VI with the voltage threshold Vth2, to determine whether there is a substantial amount of energy transmitted to the output terminal OUT. That is, the comparator 223 can generate the determination signal S3 to represent the second information CI2. The logic determination circuit 23 and the current sensing circuit 21 of this embodiment operate according to substantially the same mechanism as the logic determination circuit 23 and the current sensing circuit 21 of the embodiment shown in FIG. 7, so they have substantially the same advantages and efficacies as the embodiment shown in FIG. 7, which are not redundantly repeated here.

Figure 11:
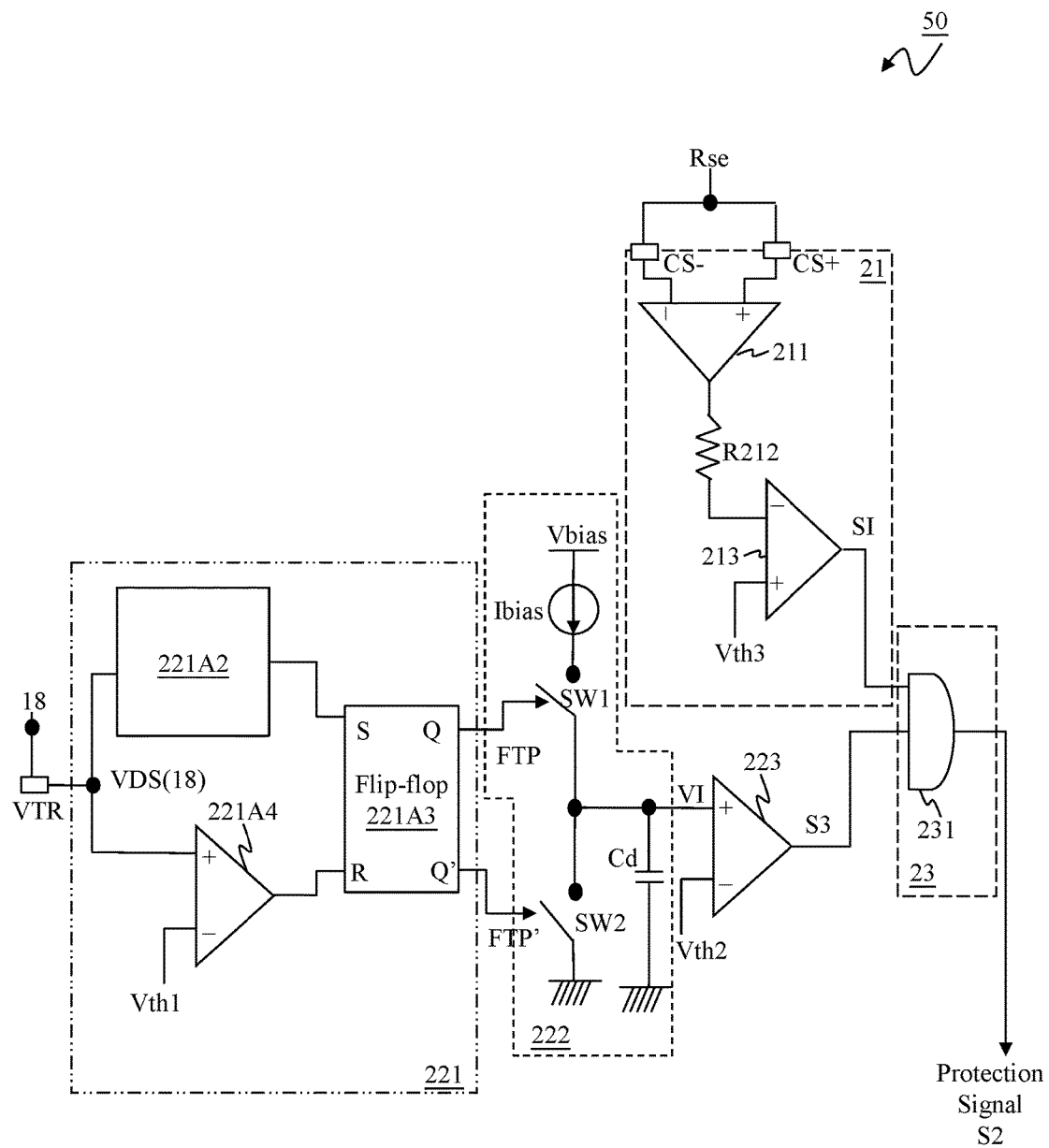
FIG. 11 shows a block diagram of a specific embodiment of a secondary side controller.
Figure 12:
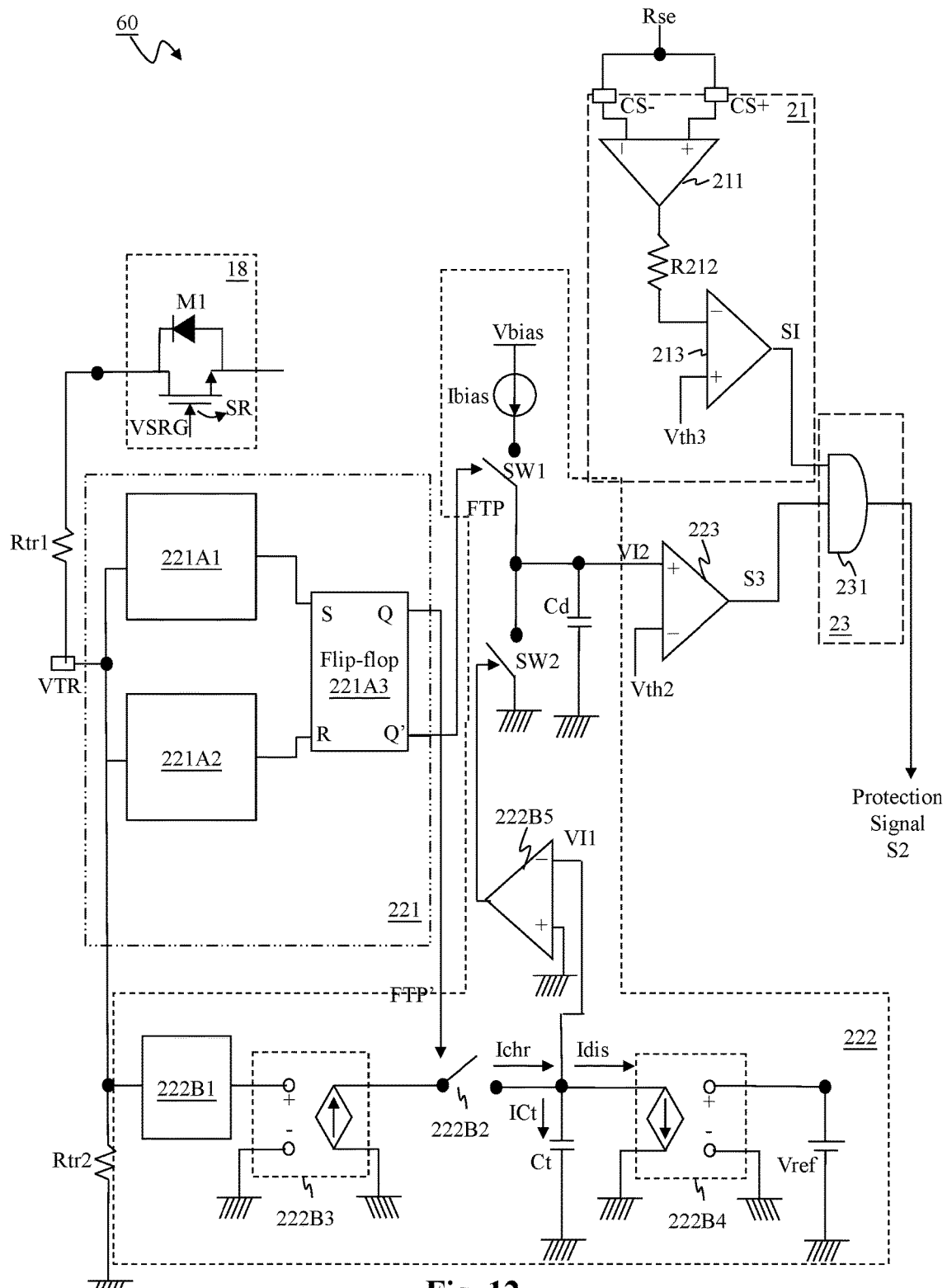
FIG. 12 shows a block diagram of a specific embodiment of a secondary side controller.
Figure 13A:
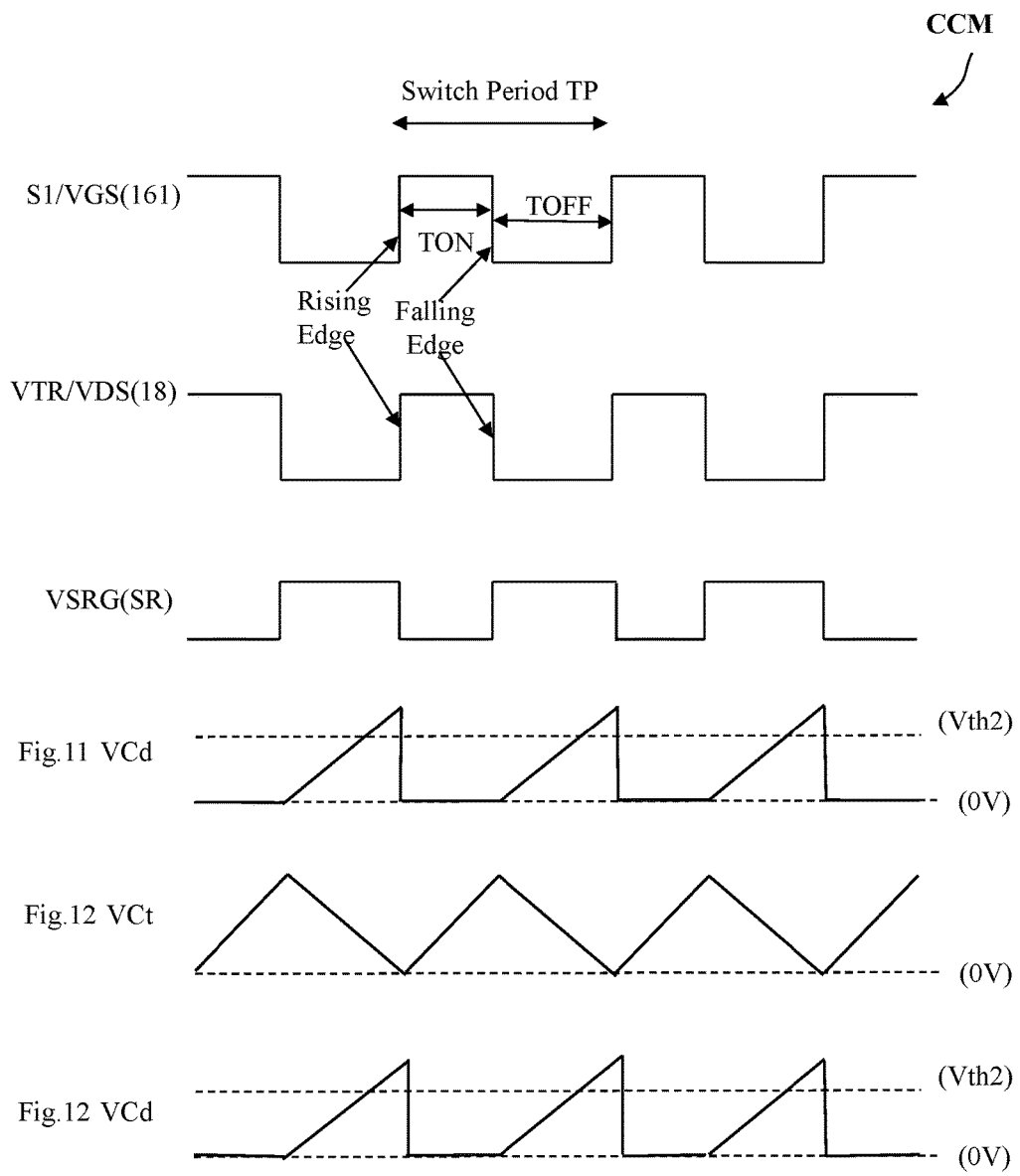
FIG. 13A shows, in correspondence with FIG. 11 and FIG. 12, a waveform diagram of the present invention under continuous conduction mode (CCM) operation.
Figure 13B:
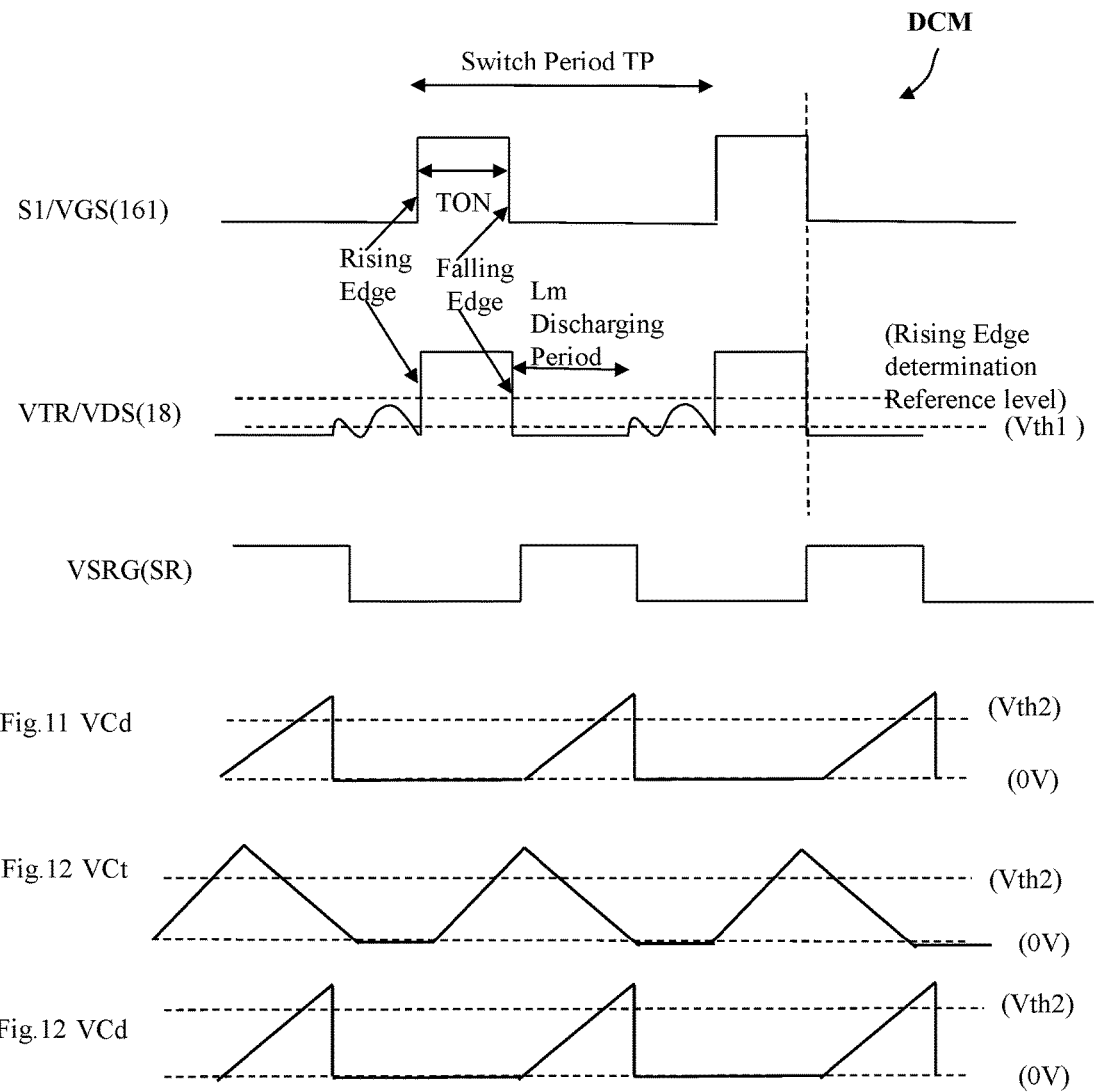
FIG. 13B shows, in correspondence with FIG. 11 and FIG. 12, a waveform diagram of the present invention under discontinuous conduction mode (DCM) operation.

Please refer to FIG. 11 together with FIG. 13A and FIG. 13B. FIG. 11 shows a block diagram of a specific embodiment of a secondary side controller 50. FIG. 13A shows, in correspondence with FIG. 11 and FIG. 12, a waveform diagram of the present invention under continuous conduction mode (CCM) operation. FIG. 13B shows, in correspondence with FIG. 11 and FIG. 12, a waveform diagram of the present invention under discontinuous conduction mode (DCM) operation.

The embodiment shown in FIG. 11 generates the second information CI2 according to the OFF time (as shown by TOFF in FIG. 13A) of the power switch 161 or discharging period of the inductor Lm (which corresponds the energy-releasing period of the secondary winding W2 releasing energy toward the output terminal OUT; referring to FIG. 13B). As shown in FIG. 11, to measure the OFF time of the power switch 161, in one embodiment, the time determination circuit 221 of the current sensing resistor short circuit determination circuit 22 can include, for example but not limited to, a voltage waveform falling edge detection circuit 221A2, a comparator 221A4 and a SR type flip-flop 221A3. In this embodiment, the OFF time information FTP (as shown by VGS(161) in FIG. 13A and FIG. 13B) can be obtained by measuring, for example but not limited to, a voltage at the left end of the rectifier device 18 (this information can be obtained through the pin VTR of the secondary side controller 50). The following description is based on the example that the rectifier device is a synchronous rectifying switch. Accordingly, the waveform of the voltage across the rectifier device 18 is the waveform of the drain-to-source voltage of the synchronous rectifying switch (as shown by VDS(18) in FIG. 10A and FIG. 10B). If the rectifier device 18 is a diode, the same principle can also be applied except that the waveform of the voltage across the rectifier device 18 is the waveform of the voltage across the diode.

More specifically, the time determination circuit 211 obtains a voltage waveform falling edge of the pin VTR through the voltage waveform falling edge detection 221A2. The result outputted from the voltage waveform falling edge detection 221A2 is inputted into the input terminal S of the SR type flip-flop 221A3. Besides, the comparator 221A4 compares the voltage obtained from the pin VTR with a voltage threshold Vth1 and outputs the comparison result to the input terminal R of the SR type flip-flop 221A3. The SR type flip-flop 221A3, according to the received voltage waveform falling edge and the output result outputted from the comparator 221A4, generates OFF time information FTP, which is transmitted to the time to voltage conversion circuit 222. Please refer to FIG. 13B. The voltage threshold Vth1 can be set to be lower than a rising edge determination reference level. The reason for such arrangement is because: under a DCM mode, when the secondary winding W2 finishes releasing energy toward the output terminal OUT, the primary winding W1 is not yet turned ON. As a consequence, the secondary winding W2 does not immediately start storing energy, and therefore the voltage obtained from the pin VTR has a ringing waveform. That is, as long as it is detected that the voltage obtained from the pin VTR has a ringing waveform, it indicates that the secondary winding W2 has finished releasing energy toward the output terminal OUT, and it is not necessary to detect a full rising edge.

The time to voltage conversion circuit 222 of this embodiment for example is substantially the same as the time to voltage conversion circuit 222 shown in FIG. 7. The time to voltage conversion circuit 222 can include, for example but not limited to, a voltage source Vbias, a current source Ibias, a switch SW1, a switch SW2 and a capacitor Cd. The time to voltage conversion circuit 222 is coupled between the time determination circuit 221 and the comparator 223 and is configured to operably perform time-to-voltage conversion on the received OFF time information FTP. After the time-to-voltage conversion, the converted OFF time information FTP is outputted to the comparator 223. When the falling edge of the waveform of the voltage obtained from the pin VTR is detected, the switch SW1 is turned ON while the switch SW2 is turned OFF. The current source Ibias charges the capacitor Cd to generate a voltage VCd having a ramp waveform across the capacitor Cd. On the other hand, when the switch SW2 is turned ON, the switch SW1 is turned OFF; the voltage VCd of the capacitor Cd drops to zero. Consequently, through ON/OFF of the switch SW1 and the switch SW2, the voltage VCd of the capacitor Cd has the waveform shown in FIG. 13A and FIG. 13B, thereby providing the voltage information VI.

The comparator 223 compares the voltage information VI (indicating OFF time of the power switch 161 or an energy-releasing period of the secondary winding W2) with the voltage threshold Vth2, to determine whether there is a substantial amount of energy transmitted to the output terminal OUT. That is, the comparator 223 can generate the determination signal S3 to represent the second information CI2. The logic determination circuit 23 and the current sensing circuit 21 of this embodiment operate according to substantially the same mechanism as the logic determination circuit 23 and the current sensing circuit 21 of the embodiment shown in FIG. 7, so they have substantially the same advantages and efficacies as the embodiment shown in FIG. 7, which are not redundantly repeated here.

Please refer to FIG. 12, which shows a block diagram of a specific embodiment of a secondary side controller 60. In this embodiment, the time determination circuit 221 can include, for example but not limited to, a voltage waveform rising edge detection circuit 221A1, a voltage waveform falling edge detection circuit 221A2 and a SR type flip-flop 221A3. The time to voltage conversion circuit 222 of this embodiment can include, for example but not limited to, a combination of the circuits shown in FIG. 7 and FIG. 8 and a comparator 222B5. That is, the time to voltage conversion circuit 222 of this embodiment can include, for example but not limited to, a voltage source Vbias, a current source Ibias, a switch SW1, a switch SW2, a capacitor Cd, a sample-and-hold circuit 222B1, a switch 222B2, a capacitor Ct, a voltage control current source 222B3, a voltage control current source 222B4 and a comparator 222B5. Similarly, the time determination circuit 221 determines the OFF time information FTP of the power switch 161 or an energy-releasing period of the secondary winding W2 according to the waveform of the voltage at the pin VTR.

As shown in FIG. 12, this embodiment generates the OFF time information FTP according to the falling edge of the waveform obtained from the pin VTR, to control the switch SW1. As a result, when the switch SW1 is turned ON, the current source Ibias charges the capacitor Cd to generate a voltage VCd (referring to FIG. 13A and FIG. 13B; this is the second information CI2). On the other hand, when the rising edge of the waveform of the voltage obtained from the pin VTR is detected, a complementary signal FTP' of the OFF time information FTP turns ON the switch 222B2. As a result, the capacitor Ct is charged and generates a voltage VCt (referring to FIG. 13A and FIG. 13B; this is the first information CI1). The comparator 222B5 determines whether to turn ON the switch SW2 according to the first information CI1, causing the voltage VCd of the capacitor Cd to drop to zero. That is, the voltage VCd (the second information CI2) represents the OFF time of the power switch 161 and an energy-releasing period of the secondary winding W2. However, when the energy releasing operation from the secondary winding W2 toward the output terminal OUT has finished, under such circumstance, even though the power switch 161 is still OFF (under a DCM mode), the switch SW2 would still be ON, so as not to charge the capacitor Cd. As a consequence, under the circumstance where the power switch 161 has been OFF for a long period yet the secondary winding W2 actually does not keep releasing energy (which means that there is substantially not too much energy transmitted to the output terminal OUT), the voltage VCd will not rise too high to cause a misjudgment.

The functions of many circuits in this embodiment have been described in the previous embodiments, which are not redundantly repeated here. Besides, the logic determination circuit 23 and the current sensing circuit 21 of this embodiment operate according to substantially the same mechanism as the logic determination circuit 23 and the current sensing circuit 21 of the embodiment shown in FIG. 7, so they have substantially the same advantages and efficacies as the embodiment shown in FIG. 7, which are not redundantly repeated here.

Figure 14:
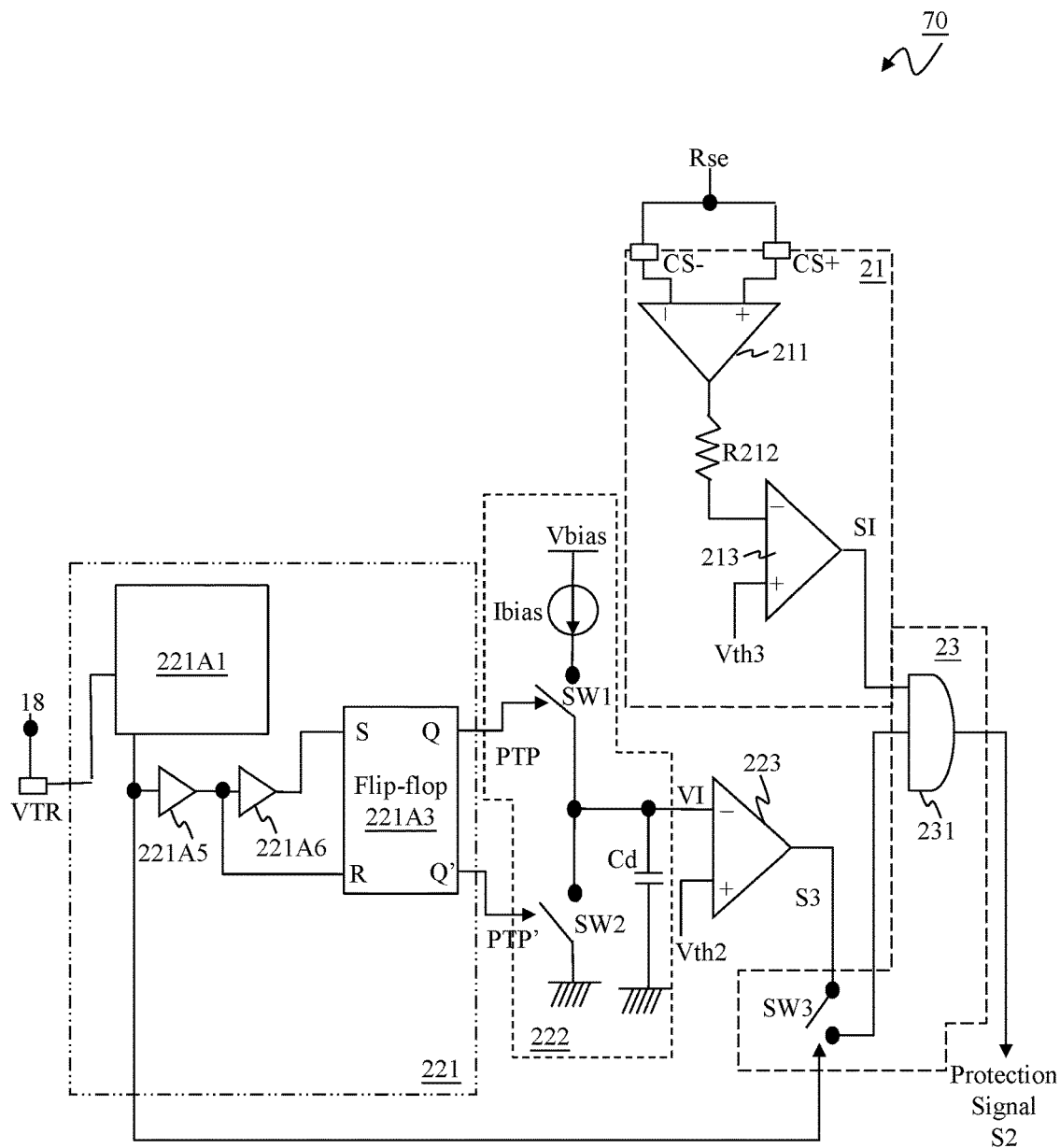
FIG. 14 shows a block diagram of a specific embodiment of a secondary side controller.
Figure 16:
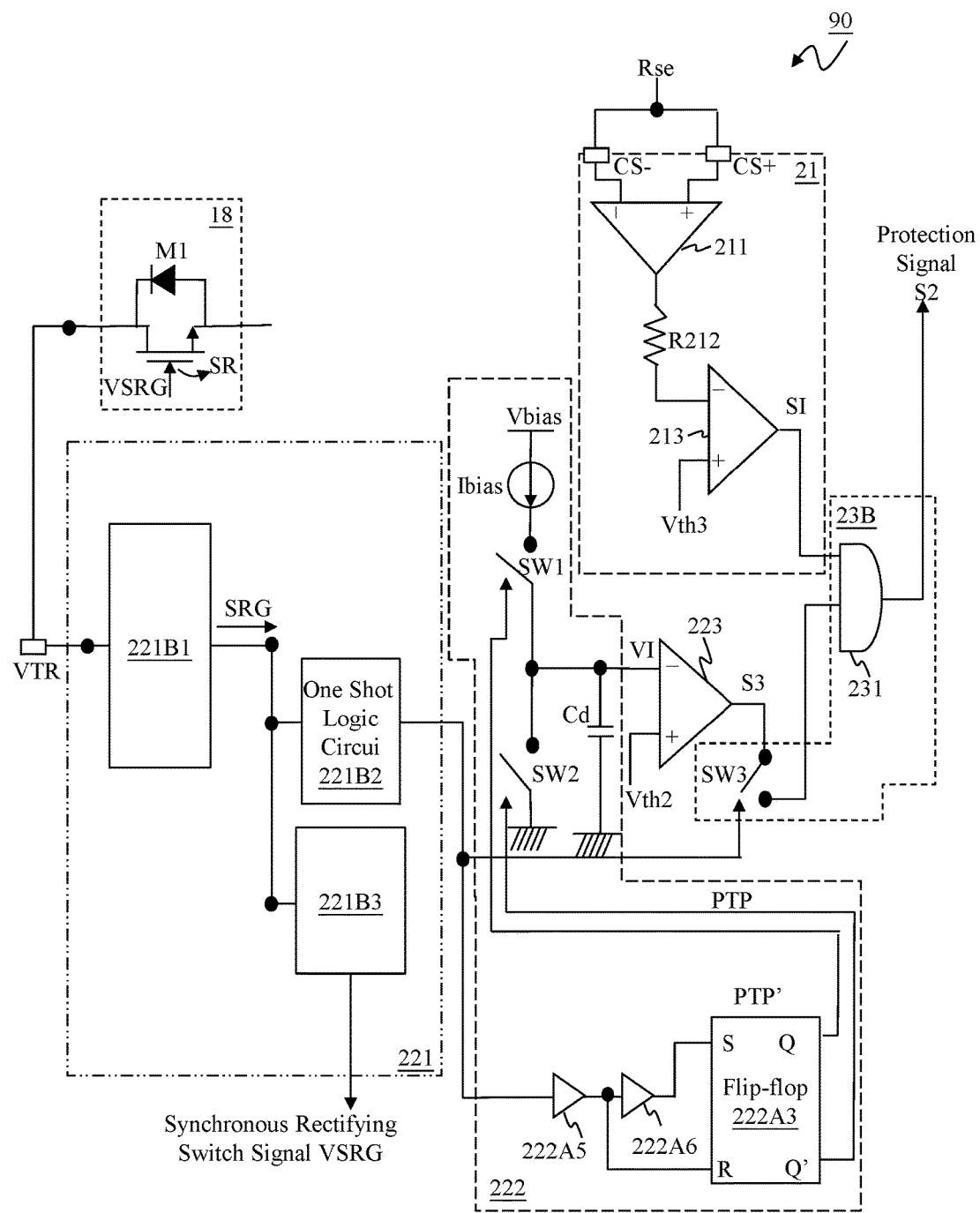
FIG. 16 shows a block diagram of a specific embodiment of a secondary side controller.
Figure 17:
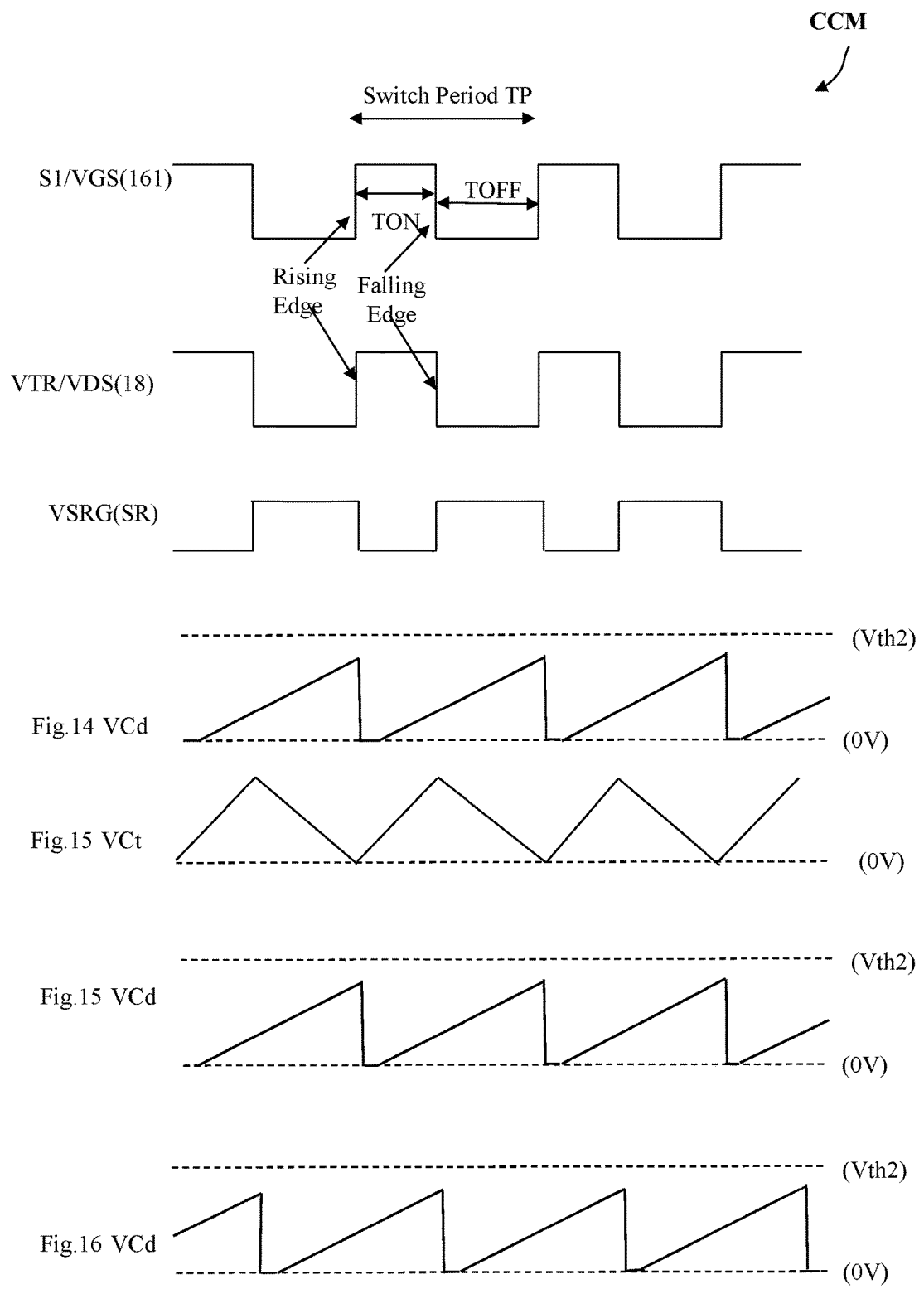
FIG. 17 shows, in correspondence with FIG. 14, FIG. 15 and FIG. 16, a waveform diagram of the present invention under continuous conduction mode (CCM) operation.

Please refer to FIG. 14 together with FIG. 17. FIG. 14 shows a block diagram of a specific embodiment of a secondary side controller 70. FIG. 17 shows, in correspondence with FIG. 14, FIG. 15 and FIG. 16, a waveform diagram of the present invention under continuous conduction mode (CCM) operation.

The embodiment shown in FIG. 14 generates the second information CI2 according to the switching period TP (as shown by TP in FIG. 17) of the power switch 161. As shown in FIG. 14, to measure the OFF time of the power switch 161, in one embodiment, the time determination circuit 221 of the current sensing resistor short circuit determination circuit 22 can include, for example but not limited to, a voltage waveform rising edge detection circuit 221A1, a delay circuit 221A5, a delay circuit 221A6 and a SR type flip-flop 221A3. In this embodiment, the switching period information PTP corresponding to the switching period TP can be obtained by measuring, for example but not limited to, a voltage at the left end of the rectifier device 18 (as shown by VDS(18) in FIG. 17) (in this embodiment, the rectifier device 18 is for example a synchronous rectifying switch).

More specifically, the switching period TP is the period between two neighboring rising edges of the gate-to-source voltage VGS(161) of the power switch 161 (or the operation signal S1). After the voltage waveform rising edge detection circuit 221A1 has obtained rising edge information, through the operation of the delay circuit 221A5 and the delay circuit 221A6, two neighboring rising edges can appropriately set and reset the S and R input terminals of the SR type flip-flop 221A3. As a consequence, the output of the SR type flip-flop 221A3 can represent the switching period information PTP corresponding to the switching period TP. Note that the use of two delay circuits in this embodiment is only for illustrative purpose, but not for limiting the scope of the present invention. It is also practicable and within the scope of the present invention to use another number of the delay circuits.

In this embodiment, the time to voltage conversion circuit 222 of this embodiment can be substantially the same as the time to voltage conversion circuit 222 shown in FIG. 7. In other words, the time to voltage conversion circuit 222 of this embodiment can include, for example but not limited to, a voltage source Vbias, a current source Ibias, a switch SW1, a switch SW2 and a capacitor Cd. The time to voltage conversion circuit 222 is coupled between the time determination circuit 221 and the comparator 223 and is configured to operably perform time-to-voltage conversion on the received switching period information PTP. After the time-to-voltage conversion, the converted switching period information PTP is outputted to the comparator 223. Operating according to the switching period information PTP and its complementary signal PTP', the voltage VCd of the capacitor Cd has the waveform shown in FIG. 17, thereby providing the voltage information VI.

The comparator 223 compares the voltage information VI (indicating the switching period TP of the power switch 161) with the voltage threshold Vth2, to generate the determination signal S3 to represent the second information CI2.

In this embodiment, the logic determination circuit 23 can optionally include a switch SW3 in addition to the AND gate 231. The switch SW3 is controlled by the output of the voltage waveform rising edge detection circuit 221A1. That is, the determination signal S3 will be effective (enabled) only under the circumstance where the voltage waveform rising edge detection circuit 221A1 has detected a rising edge, thereby avoiding misjudgment during the very beginning when the circuit is starting. Except the switch SW3, the logic determination circuit 23 of this embodiment operates according to substantially the same mechanism as the logic determination circuit 23 of the embodiment shown in FIG. 7, so it has substantially the same advantages and efficacies as the embodiment shown in FIG. 7, which are not redundantly repeated here.

The current sensing circuit 21 of this embodiment operates according to substantially the same mechanism as the current sensing circuit 21 of the embodiment shown in FIG. 7, so it has substantially the same advantages and efficacies as the embodiment shown in FIG. 7, which are not redundantly repeated here.

Figure 15:
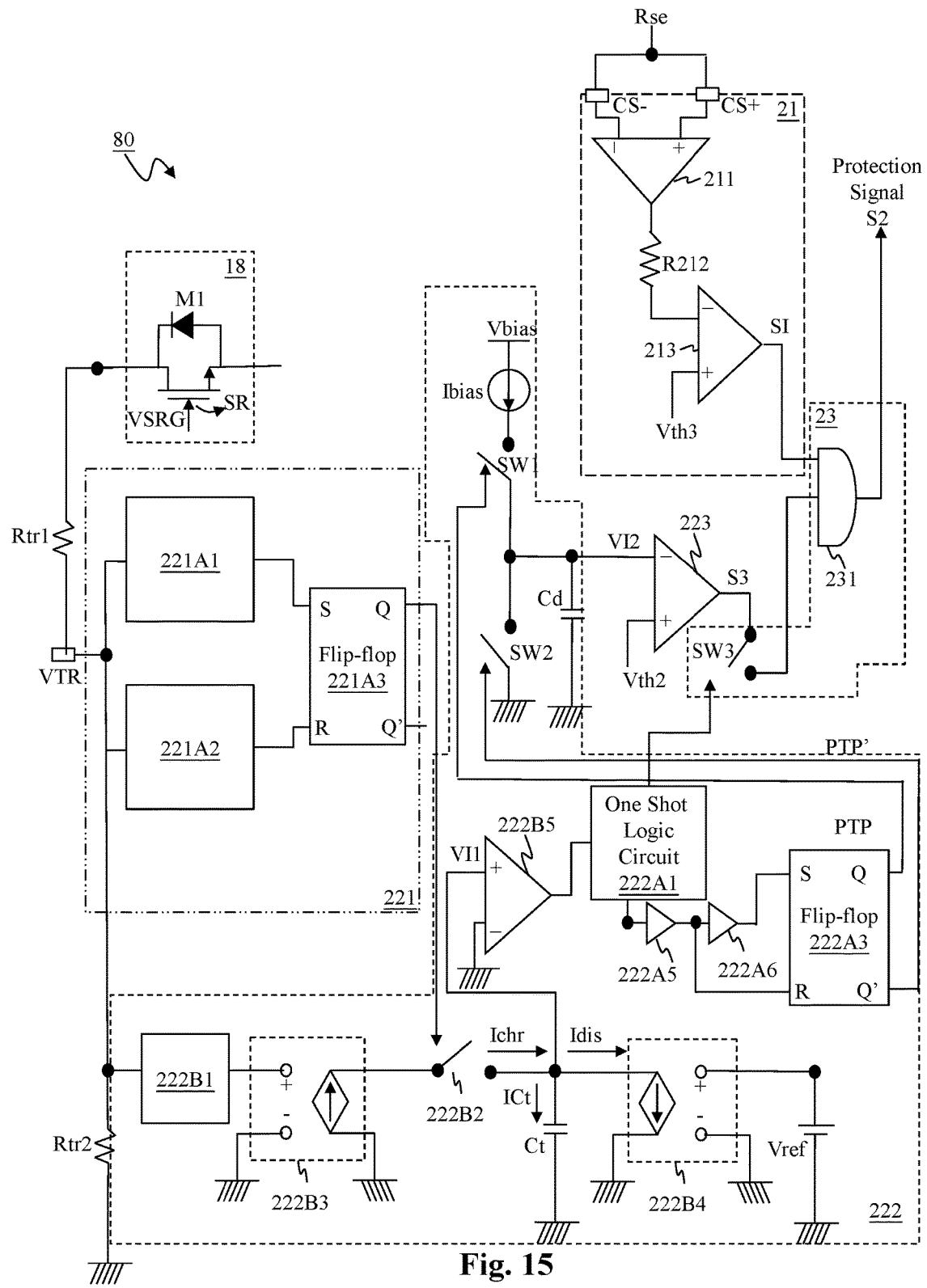
FIG. 15 shows a block diagram of a specific embodiment of a secondary side controller.

Please refer to FIG. 15 together with FIG. 17. FIG. 15 shows a block diagram of a specific embodiment of a secondary side controller 80.

As shown in FIG. 15, to measure the switching period TP of the power switch 161, in one embodiment, the time determination circuit 221 of the current sensing resistor short circuit determination circuit 22 can include, for example but not limited to, a voltage waveform rising edge detection circuit 221A1, a voltage waveform falling edge detection circuit 221A2 and a SR type flip-flop 221A3. The current sensing resistor short circuit determination circuit 22 can obtain a waveform of the voltage at the left end of the rectifier device 18 (in this embodiment, the rectifier device 18 is for example a synchronous rectifying switch) through the pin VTR. The time determination circuit 221 detects the rising edge and the falling edge of the waveform of the voltage obtained through the pin VTR. The thus obtained rising edge and falling edge are inputted into the S and R input terminals of the SR type flip-flop 221A3, respectively. The SR type flip-flop 221A3 outputs a signal to control the switch 222B2 of the time to voltage conversion circuit 222 according to the received rising edge and falling edge.

In one embodiment, the time to voltage conversion circuit 222 can include, for example but not limited to, a sample-and-hold circuit 222B1, a switch 222B2, a capacitor Ct, a voltage control current source 222B3, a voltage control current source 222B4, a comparator 222B5, a one shot logic circuit 222A1, a delay circuit 222A5, a delay circuit 222A6 and a SR type flip-flop 222A3. The time to voltage conversion circuit 222 is coupled between the time determination circuit 221 and the comparator 223.

The sample-and-hold circuit 222B1 is configured to operably sample-and-hold a voltage obtained from the pin VTR, to generate a sample-and-hold voltage. The sample-and-hold voltage is outputted to the voltage control current source 222B3 to control the voltage control current source 222B3. When the switch 222B2 is turned ON, the voltage control current source 222B3 charges the capacitor Ct with a charging current Ichr. When the switch 222B2 is turned OFF, the capacitor Ct is controlled by the voltage control current source 222B4 and is discharged by a discharging current Idis. Consequently, the voltage VCt of the capacitor Ct has the waveform shown in FIG. 17, thereby providing the voltage information VI1.

The comparator 222B5 compares the voltage information VI (the voltage VCt of the capacitor Ct) with a ground level, to generate an output indicating a rising edge of the gate-to-source voltage VGS(161) of the power switch 161 or a rising edge of the operation signal S1. The delay circuit 221A5, the delay circuit 221A6 and the SR type flip-flop 221A3 of this embodiment operate according to substantially the same mechanism as the delay circuit 221A5, the delay circuit 221A6 and the SR type flip-flop 221A3 of the embodiment shown in FIG. 14. In brief, through the operation of the delay circuit 221A5 and the delay circuit 221A6, two neighboring rising edges can appropriately set and reset the S and R input terminals of the SR type flip-flop 221A3. As a consequence, the output of the SR type flip-flop 221A3 can represent the switching period information PTP corresponding to the switching period TP.

The switch SW1 and the switch SW2 are controlled according to the switching period information PTP and its complementary signal PTP', respectively. As a result, the voltage VCd of the capacitor Cd has the waveform shown in FIG. 17, thereby providing the voltage information VI2 to the comparator 223.

The one shot logic circuit 222A1 and the switch SW3 of the logic determination circuit 23 of this embodiment operate according to substantially the same mechanism as the one shot logic circuit 222A1 and the switch SW3 of the logic determination circuit 23 of the embodiment shown in FIG. 14. In brief, the determination signal S3 will be effective (enabled) only under a circumstance where a rising edge of the gate-to-source voltage VGS(161) of the power switch 161 or a rising edge of the operation signal S1 is detected, thereby avoiding misjudgment during the very beginning when the circuit is starting.

The current sensing circuit 21 of this embodiment operates according to substantially the same mechanism as the current sensing circuit 21 of the embodiment shown in FIG. 7, so it has substantially the same advantages and efficacies as the embodiment shown in FIG. 7, which are not redundantly repeated here. Besides, the logic determination circuit 23 of this embodiment operates according to substantially the same mechanism as the logic determination circuit 23 of the embodiment shown in FIG. 14, so it has substantially the same advantages and efficacies as the embodiment shown in FIG. 14, which are not redundantly repeated here.

Please refer to FIG. 16, which shows a block diagram of a specific embodiment of a secondary side controller 90.

As shown in FIG. 16, this embodiment obtains the switching period information PTP by measuring a gate signal (i.e., the synchronous rectifying switch signal VSRG) of the synchronous rectifying switch. Although the synchronous rectifying switch signal VSRG is complementary to the gate signal of the power switch 161, they both have the same period. In one embodiment, the time determination circuit 22 can include, for example but not limited to, a synchronous rectifying switch control unit 221B1, a one shot logic circuit 221B2 and a synchronous rectifying switch driver gate 221B3. The synchronous rectifying switch control unit 221B1 and the synchronous rectifying switch driver gate 221B3 are employed to generate the synchronous rectifying switch signal VSRG, to control the synchronous rectifying switch; therefore, the time determination circuit 221 can be regarded as including only the one shot logic circuit 221B2.

More specifically, the synchronous rectifying switch control unit 221B1 receives the voltage at the left end of the rectifier device 18 (i.e., the synchronous rectifying switch) through the pin VTR of the secondary side controller 90, to determine whether to turn ON the synchronous rectifying switch, and generate a corresponding initial synchronous rectifying switch signal SRG. The initial synchronous rectifying switch signal SRG is converted to an appropriate level (i.e., the synchronous rectifying switch signal VSRG) via the synchronous rectifying switch driver gate 221B3, to drive the synchronous rectifying switch. If the signal operation levels internal to and external to the secondary side controller 90 are approximately equal, the synchronous rectifying switch driver gate 221B3 can be omitted. Because the meaning of the initial synchronous rectifying switch signal SRG is equivalent to the meaning of the synchronous rectifying switch signal VSRG, the initial synchronous rectifying switch signal SRG and the synchronous rectifying switch signal VSRG can be viewed as one same signal.

On the other hand, the falling edge of the initial synchronous rectifying switch signal SRG generates a single pulse via the one shot logic circuit 221B2.

More specifically, the switching period TP is defined as a period between two neighboring falling edges of the initial synchronous rectifying switch signal SRG. After the one shot logic circuit 221B2 has obtained the falling edge information, through the operation of the delay circuit 221A5 and the delay circuit 221A6, two neighboring falling edges can appropriately set and reset the S and R input terminals of the SR type flip-flop 221A3, respectively. As a consequence, the output of the SR type flip-flop 221A3 can represent the switching period information PTP corresponding to the switching period TP.

The time to voltage conversion circuit 222 of this embodiment can be substantially the same as the time to voltage conversion circuit 222 shown in FIG. 7. In other words, the time to voltage conversion circuit 222 of this embodiment can include, for example but not limited to, a voltage source Vbias, a current source Ibias, a switch SW1, a switch SW2 and a capacitor Cd. The time to voltage conversion circuit 222 is coupled between the time determination circuit 221 and the comparator 223 and is configured to operably perform time-to-voltage conversion on the received switching period information PTP. After the time-to-voltage conversion, the converted switching period information PTP is outputted to the comparator 223. Operating according to the switching period information PTP and its complementary signal PTP', the voltage VCd of the capacitor Cd has the waveform shown in FIG. 17, thereby providing the voltage information VI.

The comparator 223 compares the voltage information VI (indicating the switching period TP) with the voltage threshold Vth2, to generate the determination signal S3 to represent the second information CI2.

In this embodiment, the logic determination circuit 23 can optionally include a switch SW3 in addition to the AND gate 231. The switch SW3 is controlled by the output of the one shot logic circuit 221B2. That is, the determination signal S3 will be effective (or enabled) only under the circumstance where the one shot logic circuit 221B2 has detected a falling edge, thereby avoiding misjudgment such as during the very beginning when the circuit is starting. Except the switch SW3, the logic determination circuit 23 of this embodiment operates according to substantially the same mechanism as the logic determination circuit 23 of the embodiment shown in FIG. 7, so it has substantially the same advantages and efficacies as the embodiment shown in FIG. 7, which are not redundantly repeated here.

Figure 18:
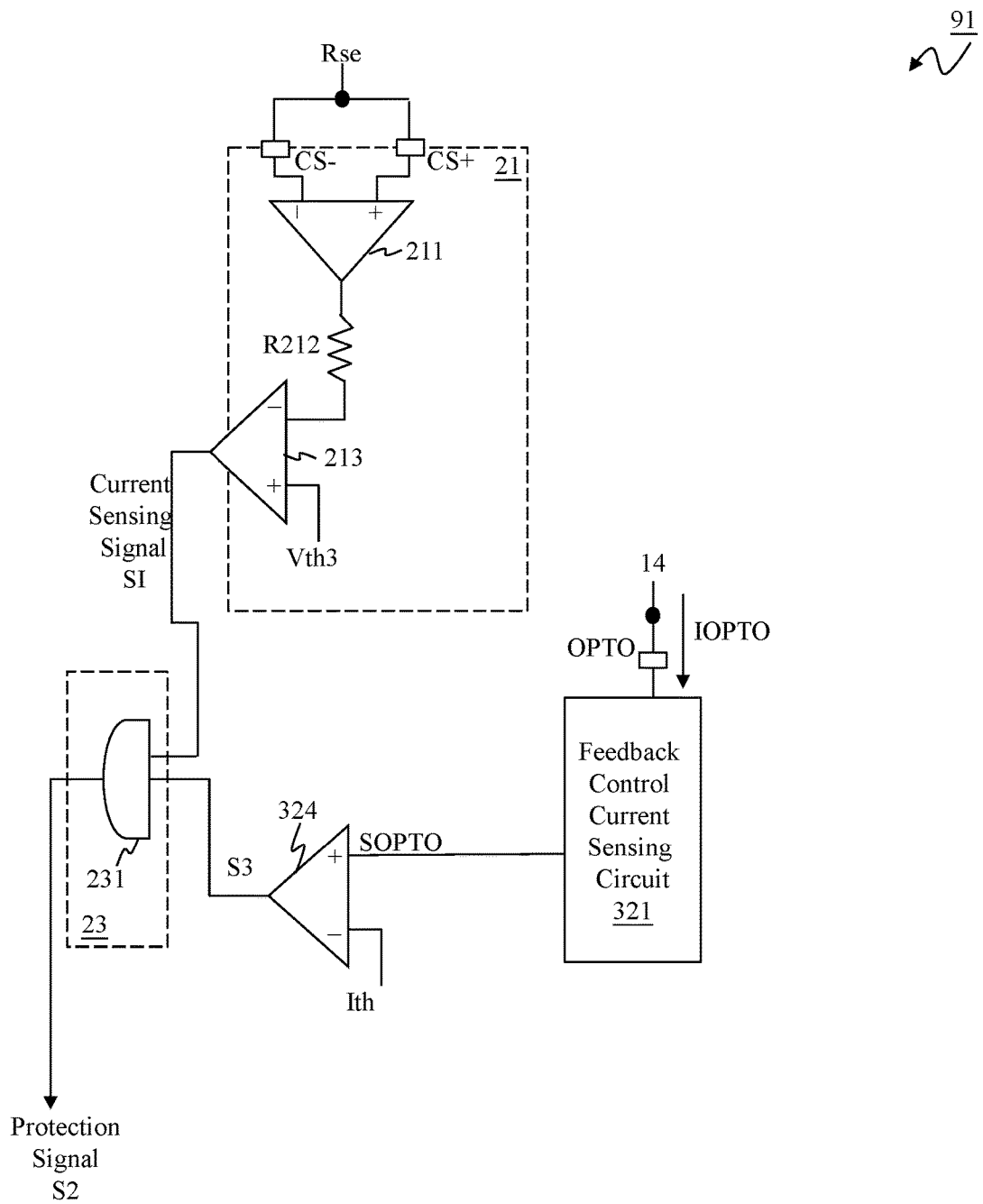
FIG. 18 shows, in correspondence with FIG. 5, a block diagram of a specific embodiment of a secondary side controller.

Please refer to FIG. 18 together with FIG. 5. FIG. 18 shows, in correspondence with FIG. 5, a block diagram of a specific embodiment of a secondary side controller 91 (in the secondary side controller 91, the circuits which are irrelevant to the mechanism for checking the first information CI1 and the second information CI2 are omitted). In the embodiment shown in FIG. 18, the secondary side controller 91 controls the current IOPTO via the pin OPTO. The current IOPTO controls the light emission by the light emitting diode of the feedback circuit 14 (please refer to FIG. 2). The feedback control current sensing circuit 321 senses the current IOPTO and generates a current related signal SOPTO according to the current IOPTO. The comparator 324 compares the current related signal SOPTO with a current threshold Ith, to determine whether the current related signal SOPTO is greater than the current threshold Ith. When the current related signal SOPTO is greater than the current threshold Ith, it indicates that the feedback control mechanism demands a greater amount of energy to be transmitted to the output terminal OUT, and therefore, it is expected that there will be a substantial amount of energy transmitted to the output terminal OUT. Thus, the determination signal S3 outputted from the comparator 324 can show the second information CI2.

The logic determination circuit 23 and the current sensing circuit 21 of this embodiment operate according to substantially the same mechanism as the logic determination circuit 23 and the current sensing circuit 21 of the embodiment shown in FIG. 7, so they have substantially the same advantages and efficacies as the embodiment shown in FIG. 7, which are not redundantly repeated here.

Figure 19:
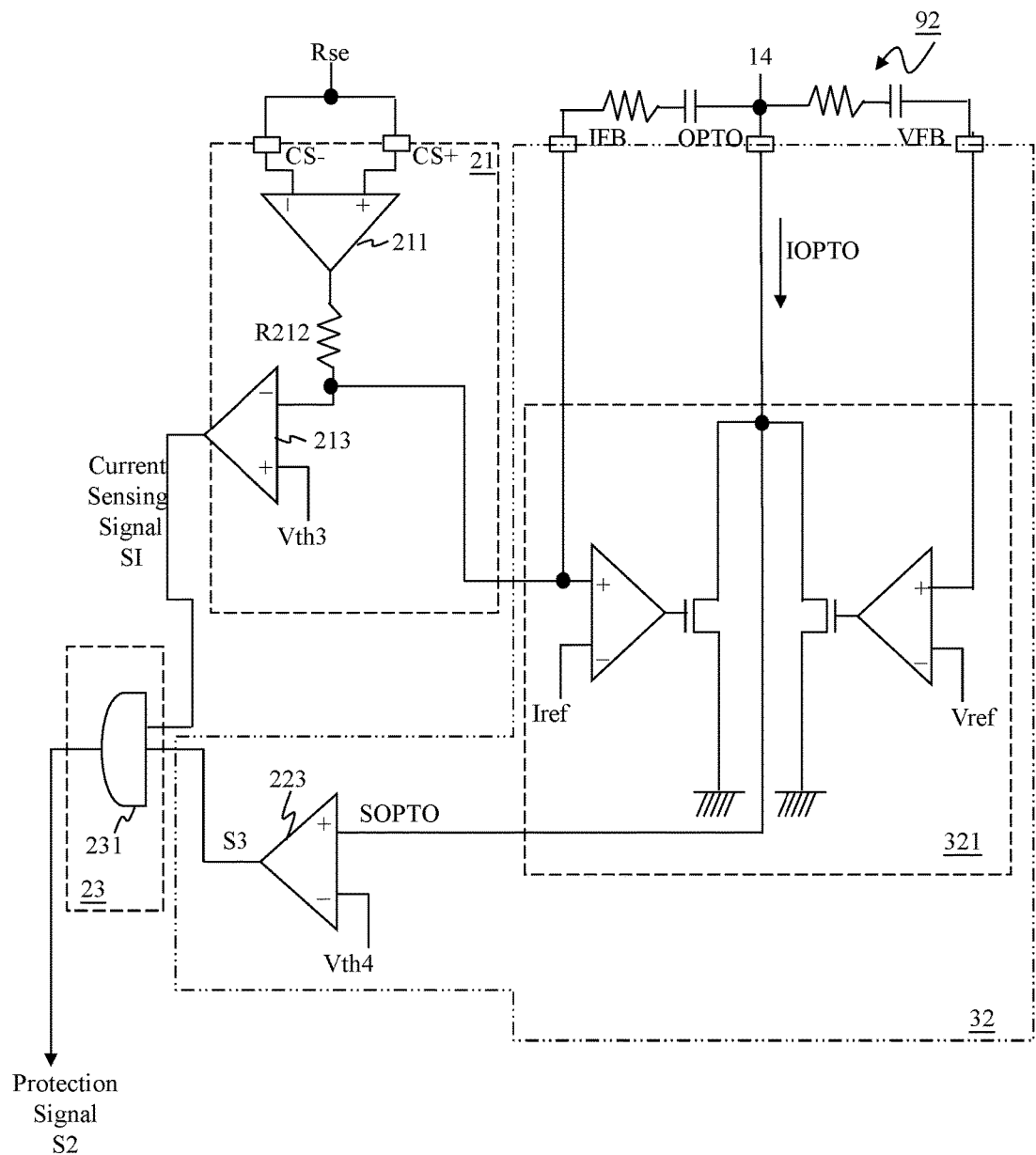
FIG. 19 shows, in correspondence with FIG. 5, a block diagram of another specific embodiment of a secondary side controller.

Please refer to FIG. 19 together with FIG. 5. FIG. 19 shows, in correspondence with FIG. 5, a block diagram of another specific embodiment of a secondary side controller 92. This embodiment shows one possible circuit implementation of the feedback control current sensing circuit 321. Note that the above-mentioned feedback control current sensing circuit 321 can be implemented by various hardware configurations; FIG. 19 shows one possible implementation, and those skilled in this art can conceive many equivalents under the teaching by the present invention. Please also refer to FIG. 1 or FIG. 3. There is a resistor at an upper end (higher voltage end) of the feedback circuit 14. Therefore, the greater the current IOPTO is, the greater the voltage drop across this resistor is. Because the current related signal SOPTO is equal to the output voltage VOUT minus the voltage drop across this resistor, the current related signal SOPTO is a voltage signal. The current threshold Ith in the above-mentioned embodiment can correspondingly be a voltage threshold Vth4 in this embodiment, to be compared with the current related signal SOPTO.

As compared to the prior art, the present invention can generate the second information CI2 (which indicates whether there is a substantial amount of energy transmitted to the output terminal OUT) through many different approaches, so as to verify whether the first information CI1 (i.e., the sensing result of the current sensing resistor Rse) is accurate. Accordingly, when there is a malfunction (for example but not limited to: an undesired short circuit of the current sensing resistor Rse), the present invention is well able to provide a better protection.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or a resistor. For another example, where appropriate, a comparator generating a digital output may be replaced by an operational amplifier generating an analog output, or vice versa, so the term "comparison circuit" can include a comparator or an operational amplifier. As one of average skill in the art will appreciate, the term "coupled", as may be used herein, includes direct connection and indirect coupling via another component, element, circuit or module. For another example, it is not limited for a high level of the signal to represent ON and a low level of the signal to represent OFF. The meaning of a high level and the meaning of a low level of the signal are interchangeable, with corresponding amendments of the circuits processing these signals. For yet another example, a D-type flip-flop and a SR-type flip-flop are interchangeable. For still another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Besides, although the power converter 100 of the present invention is for example an isolated type power converter having a transformer, the present invention can also be applied to a non-isolated type power converter, to check whether the first information and the second information are contradictory to each other. In view of the foregoing, the spirit of the present invention should cover all such and other modifications and variations, which should be interpreted to fall within the scope of the following claims and their equivalents.

What is claimed is:

1. A power converter, configured to operably convert an input voltage to an output voltage at an output terminal of the power converter, the power converter comprising:
   a transformer including a primary winding and a secondary winding, wherein a secondary side of the transformer forms a current loop, to supply an output current to the output terminal;
   a power switch coupled to the primary winding of the transformer, wherein the power switch is configured to be operably turned ON or turned OFF according to an operation signal, to control the primary winding of the transformer, so that the input voltage coupled to the primary winding of the transformer is converted to the output voltage coupled to the secondary winding of the transformer;
   a primary side controller, which is coupled to the power switch and which is configured to operably generate the operation signal according to a primary side feedback signal which is related to the output voltage;
   a feedback circuit, which is configured to operably generate the primary side feedback signal;
   a current sensing resistor, which is connected in the current loop formed at the secondary side of the transformer and which is configured to operably detect the output current, so as to generate first information which relates to the output current;
   a rectifier device, which is coupled to the secondary winding of the transformer and which is configured to operably control a current flow direction of the current loop formed at the secondary side of the transformer; and
   a secondary side controller, which is coupled to the output terminal and the feedback circuit and which is configured to operably control the generation of the primary side feedback signal by the feedback circuit according to the output voltage, the secondary side controller being coupled to the current sensing resistor to retrieve the first information, and being coupled to at least one end of the rectifier device to retrieve second information, wherein the second information is information of time which indicates whether there is a substantial amount of energy transmitted to the output terminal;
   wherein the secondary side controller determines whether there is a malfunction by checking:
   (1) whether or not the first information indicates that there is no or only few output current but the second information indicates that there is a substantial amount of energy transmitted to the output terminal, or
   (2) whether or not the first information indicates that there is a substantial amount of current transmitted to the output terminal but the second information indicates there is no energy or only few energy transmitted to the output terminal,
   to determine whether the first information and the second information are contradictory to each other, and when either (1) or (2) is found, the secondary side controller determines that there is contradiction and a malfunction occurs.

2. The power converter of claim 1, wherein when the first information indicates that there is no current or there is only few current but the second information indicates that there is a substantial amount of energy transmitted to the output terminal, the current sensing resistor is determined being short-circuited.

3. The power converter of claim 1, wherein the second information is obtained according to an ON time, an OFF time, a switching period or a switching frequency of the power switch, or an energy-releasing period of the secondary winding of the transformer of the power switch.

4. The power converter of claim 1, wherein the secondary side controller includes:
   a current sensing circuit, which is configured to operably generate a current sensing signal indicating the first information according to the output current;
   a current sensing resistor short circuit determination circuit, which is configured to operably generate a determination signal indicating the second information according to a signal waveform at the at least one end of the rectifier device; and
   a logic determination circuit, which is configured to operably check whether the first information and the second information are contradictory to each other according to the current sensing signal and the determination signal.

5. The power converter of claim 4, wherein the current sensing resistor short circuit determination circuit includes:
   a time determination circuit, which is configured to operably obtain the ON time, the OFF time or the switching period of the power switch or the energy-releasing period of the secondary winding of the transformer according to the signal waveform at the at least one end of the rectifier device, to generate time information;
   a time to voltage conversion circuit, which is configured to operably generate voltage information corresponding to the time information according to the time information generated by the time determination circuit; and
   a comparison circuit, which is configured to operably compare the voltage information with a voltage threshold, so as to generate the determination signal.

6. A secondary side controller for use in a power converter, the power converter being configured to operably convert an input voltage to an output voltage at an output terminal of the power converter, the power converter comprising: a transformer including a primary winding and a secondary winding, wherein a secondary side of the transformer forms a current loop, to supply an output current to the output terminal; a power switch, which is coupled to the primary winding of the transformer and which is configured to control the primary winding of the transformer, so that the input voltage coupled to the primary winding of the transformer is converted to the output voltage coupled to the secondary winding of the transformer; a primary side controller, which is coupled to the power switch and which is configured to operably control the power switch according to a primary side feedback signal which is related to the output voltage; a feedback circuit, which is configured to operably generate the primary side feedback signal; a current sensing resistor, which is connected in the current loop formed at the secondary side of the transformer and which is configured to operably detect the output current, so as to generate first information which relates to the output current; a rectifier device, which is coupled to the secondary winding of the transformer and which is configured to operably control a current flow direction of the current loop formed at the secondary side of the transformer; and the secondary side controller, which is coupled to the output terminal and the feedback circuit and which is configured to operably control the generation of the primary side feedback signal by the feedback circuit according to the output voltage, the secondary side controller being coupled to the current sensing resistor to retrieve the first information, and the secondary side controller being coupled to at least one end of the rectifier device to retrieve second information, wherein the second information indicates whether there is a substantial amount of energy transmitted to the output terminal; wherein, by checking whether the first information and the second information are contradictory to each other, the secondary side controller determines whether there is a malfunction, the secondary side controller comprising:
   a current sensing circuit, which is configured to operably generate a current sensing signal indicating the first information according to the output current;
   a current sensing resistor short circuit determination circuit, which is configured to operably generate a determination signal indicating the second information according to information of time indicated by a signal waveform at the at least one end of the rectifier device; and
   a logic determination circuit, which is configured to operably check, according to the current sensing signal and the determination signal:
   (1) whether or not the first information indicates that there is no or only few output current but the second information indicates that there is a substantial amount of energy transmitted to the output terminal, or
   (2) whether or not the first information indicates that there is a substantial amount of current transmitted to the output terminal but the second information indicates there is no energy or only few energy transmitted to the output terminal,
   to determine whether the first information and the second information are contradictory to each other, and when either (1) or (2) is found, the secondary side controller determines that there is contradiction and a malfunction occurs.

7. The secondary side controller of claim 6, wherein the current sensing resistor short circuit determination circuit includes:
   a time determination circuit, which is configured to operably obtain the ON time, the OFF time or the switching period of the power switch or the energy-releasing period of the secondary winding of the transformer according to the signal waveform at the at least one end of the rectifier device, to generate time information;
   a time to voltage conversion circuit, which is configured to operably generate voltage information corresponding to the time information according to the time information generated by the time determination circuit; and
   a comparison circuit, which is configured to operably compare the voltage information with a voltage threshold, so as to generate the determination signal.

8. The secondary side controller of claim 6, wherein the logic determination circuit includes a logic gate.

9. The secondary side controller of claim 8, wherein the logic determination circuit further includes a switch, which is coupled between the determination signal and the logic gate; wherein, after a rising edge or a falling edge of the signal waveform at the at least one end of the rectifier device is detected, the switch is turned ON, so as to allow the determination signal to be transmitted to the logic gate.

10. A power converter, configured to operably convert an input voltage to an output voltage at an output terminal of the power converter, the power converter comprising:

a transformer including a primary winding and a secondary winding, wherein a secondary side of the transformer forms a current loop, to supply an output current to the output terminal;

a power switch coupled to the primary winding of the transformer, wherein the power switch is configured to be operably turned ON or turned OFF according to an operation signal, to control the primary winding of the transformer, so that the input voltage coupled to the primary winding of the transformer is converted to the output voltage coupled to the secondary winding of the transformer;

a primary side controller, which is coupled to the power switch and which is configured to operably generate the operation signal according to a primary side feedback signal which is related to the output voltage;

a feedback circuit, which is configured to operably generate the primary side feedback signal;

a current sensing resistor, which is connected in the current loop formed at the secondary side of the transformer and which is configured to operably detect the output current, so as to generate first information which relates to the output current; and a secondary side controller, which is coupled to the current sensing resistor and which is configured to operably retrieve the first information, the secondary side controller being coupled to the output terminal and the feedback circuit and being configured to operably control a current flowing through the feedback circuit according to the output voltage, so as to generate the primary side feedback signal; wherein the secondary side controller retrieves second information which is information of time which indicates whether there is a substantial amount of energy transmitted to the output terminal according to the current flowing through the feedback circuit;

wherein the secondary side controller determines whether there is a malfunction by checking:

(1) whether or not the first information indicates that there is no or only few output current but the second information indicates that there is a substantial amount of energy transmitted to the output terminal, or (2) whether or not the first information indicates that there is a substantial amount of current transmitted to the output terminal but the second information indicates there is no energy or only few energy transmitted to the output terminal, to determine whether the first information and the second information are contradictory to each other, and when either (1) or (2) is found, the secondary side controller determines that there is contradiction and a malfunction occurs.

11. A short circuit determination method for a current sensing resistor for use in a power converter, the power converter being configured to be operably controlled by a power switch, to convert an input voltage to an output voltage at an output terminal of the power converter and supply an output current to the output terminal, and the power converter being configured to sense the output current through a current sensing resistor, the current sensing resistor short circuit determination method comprising:

generating an operation signal according to a feedback signal related to the output voltage, so as to control the power switch;

detecting the output current through the current sensing resistor so as to generate first information, wherein the first information is related to the output current;

generating second information according to information of time, wherein the information of time is an ON time, an OFF time or a switching period of the power switch or an energy-releasing period for transmitting energy to the output terminal, and wherein the second information indicates whether there is a substantial amount of energy transmitted to the output terminal; and determining whether the first information and the second information are contradictory to each other by checking:

(1) whether or not the first information indicates that there is no or only few output current but the second information indicates that there is a substantial amount of energy transmitted to the output terminal, or (2) whether or not the first information indicates that there is a substantial amount of current transmitted to the output terminal but the second information indicates there is no energy or only few energy transmitted to the output terminal, and when either (1) or (2) is found, there is contradiction and a malfunction occurs.

12. The short circuit determination method for the current sensing resistor of claim 11, wherein the power converter further includes a transformer and a rectifier device, the transformer including a primary winding and a secondary winding coupled to each other, the rectifier device being coupled to the secondary winding, and wherein the step of generating the second information includes: determining an ON time, an OFF time or a switching period of the power switch or determining an energy-releasing period for transmitting energy to the output terminal, according to a signal waveform at an end of the rectifier device which is coupled to the secondary winding.

13. The short circuit determination method for the current sensing resistor of claim 11, wherein the power converter further includes a transformer and a synchronous rectifying switch, the transformer including a primary winding and a secondary winding coupled to each other, the synchronous rectifying switch being coupled to the secondary winding, and wherein the step of generating the second information includes: determining an ON time, an OFF time or a switching period of the power switch or determining an energy-releasing period for transmitting energy to the output terminal, according to a gate signal of the synchronous rectifying switch.

* * * * *